(12) United States Patent
Pratt, Jr. et al.

(10) Patent No.: US 8,676,219 B2
(45) Date of Patent: Mar. 18, 2014

(54) COMBINED WIRED AND WIRELESS COMMUNICATIONS WITH FIELD DEVICES IN A PROCESS CONTROL ENVIRONMENT

(75) Inventors: Wallace A. Pratt, Jr., Pflugerville, TX (US); Mark J. Nixon, Round Rock, TX (US); Eric D. Rotvold, West St. Paul, MN (US); Robin S. Pramanik, Karlsruhe (DE); Tomas P. Lennvall, Vasteras (SE)

(73) Assignee: Hart Communication Foundation, Austin, TX (US)

( * ) Notice: Subject to any disclaimer, the term of this patent is extended or adjusted under 35 U.S.C. 154(b) by 852 days.

(21) Appl. No.: 12/100,986

(22) Filed: Apr. 10, 2008

(65) Prior Publication Data

US 2008/0274766 A1 Nov. 6, 2008

Related U.S. Application Data

(60) Provisional application No. 60/911,795, filed on Apr. 13, 2007.

(51) Int. Cl.
*H04W 40/00* (2009.01)
(52) U.S. Cl.
USPC ............. 455/448; 455/426.1; 455/426.2; 370/406; 370/400; 370/389; 370/395.5
(58) Field of Classification Search
USPC .................. 455/422.1–426.2, 448; 370/351, 370/241–253, 328–349, 389–395.1, 395.3, 370/395.5–395.65, 400–411, 475
See application file for complete search history.

(56) References Cited

U.S. PATENT DOCUMENTS 4,792,944 A   12/1988   Takahashi et al.
5,159,592 A   10/1992   Perkins
(Continued)

FOREIGN PATENT DOCUMENTS

CA   2324563 A1   9/1999
CN   1170464 A    1/1998
(Continued)

OTHER PUBLICATIONS

"A Survey and Analysis of Wireless Field bus for Industrial Environments", Pulat Matkurbanov, SeungKi Lee, Dong-Sung Kim; Dept. of Electron. Eng., Kumoh Nat. Inst. of Technol., Gumi. This paper appears in: SICE-ICASE, 2006. International Joint Conference; Issue Date: Oct. 18-21, 2006, on pp. 5555-5561; Print ISBN: 89-950038-4-7.*

(Continued)

*Primary Examiner* — Ronald Eisner

(57) ABSTRACT

A method of providing a wireless extension to a plant automation network connected to a plurality of wired devices, each wired device performing a process control function, includes connecting a plurality of wireless devices to the plant automation network, each of the plurality of wireless devices adapted to communicate with at least another one of the plurality of wireless devices via at least one respective wireless connection; and providing access to each of the plurality of wireless devices from a host disposed in the plant automation network, such that the host accesses the plurality of wired devices and the plurality of wireless devices using a common communication scheme.

20 Claims, 13 Drawing Sheets

(56) References Cited

U.S. PATENT DOCUMENTS

| | | | |
|---|---|---|---|
| 5,719,859 A | 2/1998 | Kobayashi et al. | |
| 5,926,531 A | 7/1999 | Petite | |
| 5,953,651 A * | 9/1999 | Lu et al. | 455/408 |
| 6,028,522 A | 2/2000 | Petite | |
| 6,198,751 B1 | 3/2001 | Dorsey et al. | |
| 6,218,953 B1 | 4/2001 | Petite | |
| 6,233,327 B1 | 5/2001 | Petite | |
| 6,236,334 B1 | 5/2001 | Tapperson et al. | |
| 6,298,377 B1 | 10/2001 | Hartikainen et al. | |
| 6,430,268 B1 | 8/2002 | Petite | |
| 6,437,692 B1 | 8/2002 | Petite et al. | |
| 6,522,974 B2 | 2/2003 | Sitton | |
| 6,578,047 B1 | 6/2003 | Deguchi | |
| 6,594,530 B1 | 7/2003 | Glanzer et al. | |
| 6,618,578 B1 | 9/2003 | Petite | |
| 6,628,764 B1 | 9/2003 | Petite | |
| 6,747,557 B1 | 6/2004 | Petite et al. | |
| 6,757,580 B2 * | 6/2004 | Shimada et al. | 700/108 |
| 6,801,777 B2 | 10/2004 | Rusch | |
| 6,836,737 B2 | 12/2004 | Petite et al. | |
| 6,891,838 B1 | 5/2005 | Petite et al. | |
| 6,914,533 B2 | 7/2005 | Petite | |
| 6,914,893 B2 | 7/2005 | Petite | |
| 6,920,171 B2 | 7/2005 | Souissi et al. | |
| 6,959,356 B2 | 10/2005 | Packwood et al. | |
| 6,970,909 B2 | 11/2005 | Schulzrinne | |
| 6,996,100 B1 | 2/2006 | Haartsen | |
| 7,002,958 B1 | 2/2006 | Basturk et al. | |
| 7,053,767 B2 | 5/2006 | Petite et al. | |
| 7,079,810 B2 | 7/2006 | Petite et al. | |
| 7,103,511 B2 | 9/2006 | Petite | |
| 7,110,380 B2 | 9/2006 | Shvodian | |
| 7,137,550 B1 | 11/2006 | Petite | |
| 7,177,952 B1 | 2/2007 | Wurch et al. | |
| 7,209,840 B2 | 4/2007 | Petite et al. | |
| 7,263,073 B2 | 8/2007 | Petite et al. | |
| 7,292,246 B2 | 11/2007 | Goldschmidt | |
| 7,295,128 B2 | 11/2007 | Petite | |
| 7,346,463 B2 | 3/2008 | Petite et al. | |
| 7,375,594 B1 | 5/2008 | Lemkin et al. | |
| 7,397,907 B2 | 7/2008 | Petite | |
| 7,420,980 B1 | 9/2008 | Pister et al. | |
| 7,468,661 B2 | 12/2008 | Petite et al. | |
| 7,529,217 B2 | 5/2009 | Pister et al. | |
| 7,602,741 B2 | 10/2009 | Tapperson et al. | |
| 7,650,425 B2 | 1/2010 | Davis et al. | |
| 7,675,935 B2 | 3/2010 | Samudrala et al. | |
| 7,680,033 B1 | 3/2010 | Khan et al. | |
| 7,697,492 B2 | 4/2010 | Petite | |
| 7,848,827 B2 | 12/2010 | Chen | |
| 7,853,221 B2 * | 12/2010 | Rodriguez et al. | 455/74 |
| 7,978,059 B2 | 7/2011 | Petite et al. | |
| 8,013,732 B2 | 9/2011 | Petite et al. | |
| 8,064,412 B2 | 11/2011 | Petite | |
| 2001/0030957 A1 | 10/2001 | McCann et al. | |
| 2001/0041591 A1 | 11/2001 | Carroll | |
| 2002/0007414 A1 | 1/2002 | Inoue et al. | |
| 2002/0013679 A1 | 1/2002 | Petite | |
| 2002/0031101 A1 | 3/2002 | Petite et al. | |
| 2002/0067693 A1 | 6/2002 | Kodialam et al. | |
| 2002/0111169 A1 | 8/2002 | Vanghi | |
| 2002/0120671 A1 | 8/2002 | Daffner et al. | |
| 2003/0014535 A1 | 1/2003 | Mora | |
| 2003/0026268 A1 | 2/2003 | Navas | |
| 2003/0040897 A1 | 2/2003 | Murphy et al. | |
| 2003/0074489 A1 | 4/2003 | Steger et al. | |
| 2003/0169722 A1 | 9/2003 | Petrus et al. | |
| 2003/0198220 A1 | 10/2003 | Gross et al. | |
| 2003/0236579 A1 | 12/2003 | Hauhia et al. | |
| 2004/0011716 A1 | 1/2004 | Sandt et al. | |
| 2004/0028023 A1 | 2/2004 | Mandhyan et al. | |
| 2004/0053600 A1 | 3/2004 | Chow et al. | |
| 2004/0090958 A1 * | 5/2004 | Park et al. | 370/389 |
| 2004/0095951 A1 | 5/2004 | Park | |
| 2004/0117497 A1 | 6/2004 | Park | |
| 2004/0148135 A1 * | 7/2004 | Balakrishnan et al. | 702/188 |
| 2004/0174904 A1 | 9/2004 | Kim et al. | |
| 2004/0183687 A1 | 9/2004 | Petite et al. | |
| 2004/0203973 A1 | 10/2004 | Khan | |
| 2004/0257995 A1 | 12/2004 | Sandy et al. | |
| 2004/0259533 A1 | 12/2004 | Nixon et al. | |
| 2005/0013253 A1 | 1/2005 | Lindskog et al. | |
| 2005/0018643 A1 | 1/2005 | Neilson et al. | |
| 2005/0025129 A1 | 2/2005 | Meier | |
| 2005/0030968 A1 | 2/2005 | Rich et al. | |
| 2005/0049727 A1 | 3/2005 | Tapperson et al. | |
| 2005/0078672 A1 | 4/2005 | Caliskan et al. | |
| 2005/0085928 A1 | 4/2005 | Shani | |
| 2005/0114517 A1 | 5/2005 | Maffeis | |
| 2005/0125085 A1 | 6/2005 | Prasad et al. | |
| 2005/0160138 A1 | 7/2005 | Ishidoshiro | |
| 2005/0164684 A1 | 7/2005 | Chen et al. | |
| 2005/0190712 A1 | 9/2005 | Lee et al. | |
| 2005/0192037 A1 | 9/2005 | Nanda et al. | |
| 2005/0213612 A1 | 9/2005 | Pister et al. | |
| 2005/0228509 A1 | 10/2005 | James | |
| 2005/0239413 A1 | 10/2005 | Wiberg et al. | |
| 2005/0249137 A1 | 11/2005 | Todd et al. | |
| 2005/0276233 A1 | 12/2005 | Shepard et al. | |
| 2005/0282494 A1 | 12/2005 | Kossi et al. | |
| 2006/0002341 A1 | 1/2006 | Bejerano et al. | |
| 2006/0007927 A1 | 1/2006 | Lee et al. | |
| 2006/0029060 A1 | 2/2006 | Pister | |
| 2006/0029061 A1 | 2/2006 | Pister et al. | |
| 2006/0045016 A1 | 3/2006 | Dawdy et al. | |
| 2006/0062192 A1 | 3/2006 | Payne | |
| 2006/0067280 A1 | 3/2006 | Howard et al. | |
| 2006/0077917 A1 | 4/2006 | Brahmajosyula et al. | |
| 2006/0120384 A1 * | 6/2006 | Boutboul et al. | 370/400 |
| 2006/0174017 A1 * | 8/2006 | Robertson | 709/229 |
| 2006/0182076 A1 * | 8/2006 | Wang | 370/338 |
| 2006/0192671 A1 | 8/2006 | Isenmann et al. | |
| 2006/0213612 A1 | 9/2006 | Perron et al. | |
| 2006/0215582 A1 | 9/2006 | Castagnoli et al. | |
| 2006/0245440 A1 | 11/2006 | Mizukoshi | |
| 2006/0253584 A1 | 11/2006 | Dixon et al. | |
| 2007/0016724 A1 * | 1/2007 | Gaither et al. | 711/105 |
| 2007/0067725 A1 * | 3/2007 | Cahill et al. | 715/733 |
| 2007/0070943 A1 | 3/2007 | Livet et al. | |
| 2007/0074489 A1 | 4/2007 | Erhardt et al. | |
| 2007/0076600 A1 | 4/2007 | Ekl et al. | |
| 2007/0078995 A1 | 4/2007 | Benard et al. | |
| 2007/0109592 A1 * | 5/2007 | Parvathaneni et al. | 358/1.15 |
| 2007/0118604 A1 * | 5/2007 | Costa Requena | 709/206 |
| 2007/0121531 A1 * | 5/2007 | Lee et al. | 370/280 |
| 2007/0140245 A1 | 6/2007 | Anjum et al. | |
| 2007/0143392 A1 | 6/2007 | Choe et al. | |
| 2007/0161371 A1 * | 7/2007 | Dobrowski et al. | 455/423 |
| 2007/0237094 A1 | 10/2007 | Bi et al. | |
| 2007/0243879 A1 * | 10/2007 | Park et al. | 455/453 |
| 2007/0280144 A1 * | 12/2007 | Hodson et al. | 370/312 |
| 2007/0280286 A1 | 12/2007 | Hodson et al. | |
| 2007/0282463 A1 | 12/2007 | Hodson et al. | |
| 2007/0283030 A1 | 12/2007 | Deininger et al. | |
| 2008/0075007 A1 | 3/2008 | Mehta et al. | |
| 2008/0082636 A1 | 4/2008 | Hofmann et al. | |
| 2008/0084852 A1 | 4/2008 | Karschnia | |
| 2008/0098226 A1 | 4/2008 | Zokumasui | |
| 2008/0117836 A1 | 5/2008 | Savoor et al. | |
| 2008/0120676 A1 | 5/2008 | Morad et al. | |
| 2008/0148296 A1 * | 6/2008 | Chen et al. | 719/328 |
| 2008/0192812 A1 | 8/2008 | Naeve et al. | |
| 2008/0198860 A1 | 8/2008 | Jain et al. | |
| 2008/0215773 A1 | 9/2008 | Christison et al. | |
| 2008/0285582 A1 | 11/2008 | Pister et al. | |
| 2009/0059855 A1 | 3/2009 | Nanda et al. | |
| 2009/0068947 A1 | 3/2009 | Petite | |
| 2009/0097502 A1 | 4/2009 | Yamamoto | |
| 2009/0154481 A1 | 6/2009 | Han et al. | |
| 2010/0194582 A1 | 8/2010 | Petite | |
| 2010/0312881 A1 | 12/2010 | Davis et al. | |

(56) References Cited

U.S. PATENT DOCUMENTS

| | | | |
|---|---|---|---|
| 2011/0264324 A1 | 10/2011 | Petite et al. | |
| 2011/0309953 A1 | 12/2011 | Petite et al. | |
| 2011/0320050 A1 | 12/2011 | Petite et al. | |

FOREIGN PATENT DOCUMENTS

| | | |
|---|---|---|
| CN | 1292534 | 4/2001 |
| CN | 1804744 A | 7/2006 |
| EP | 1169690 A2 | 1/2002 |
| EP | 1236075 A2 | 9/2002 |
| EP | 1293853 A1 | 3/2003 |
| EP | 1370958 A1 | 12/2003 |
| EP | 1376939 A2 | 1/2004 |
| EP | 2388708 A1 | 11/2011 |
| GB | 2 403 043 A | 12/2004 |
| JP | 2005 14300 | 6/2005 |
| KR | 1020010076781 | 8/2001 |
| KR | 1020040048245 | 6/2004 |
| KR | 1020050028737 | 3/2005 |
| KR | 1020060066580 | 6/2006 |
| KR | 1020050016891 | 9/2006 |
| KR | 1020060111318 | 10/2006 |
| KR | 1020070026600 | 3/2007 |
| WO | WO-00/55825 A1 | 9/2000 |
| WO | WO-01/35190 A2 | 5/2001 |
| WO | WO-0205199 | 1/2002 |
| WO | WO-02/13036 A1 | 2/2002 |
| WO | WO-02/13412 A1 | 2/2002 |
| WO | WO-02/13413 A1 | 2/2002 |
| WO | WO-02/13414 A1 | 2/2002 |
| WO | WO-02/075565 A1 | 9/2002 |
| WO | WO-2005079026 A1 | 8/2005 |
| WO | WO-2005/096722 A2 | 10/2005 |
| WO | WO-2006121114 | 11/2006 |

OTHER PUBLICATIONS

International Preliminary Report on Patentability from corresponding International Application No. PCT/US08/04750 (Oct. 13, 2009).
International Search Report and Written Opinion for corresponding International Application No. PCT/US2008/04750 (May 13, 2000).
European Supplementary Search Report for European Patent Application No. 08 826 678.8 based on PCT/US2008/004750.
Matkurbanov et al., "A Survey and Analysis of Wireless Fieldbus for Industrial Environments," SICE-ICCAS 2006 International Joint Conference, 5555-5561 (2006).
Lopez et al., "Wireless communications deployment in industry: a review of issues, options and technologies," Computers in Industry, Elsevier Science, 56:29-53 (2005).
Shen et al., "Wireless Sensor Networks for Industrial Applications," WCICA, 15-19 (2004).
Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.
Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.

Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.
Kastner et al., "Communication Systems for Building Automation and Control," Proceedings of the IEEE, vol. 93, No. 6, Jun. 1, 2005, pp. 1178-1203.
Thomesse, J., "Fieldbus Technology in Industrial Automation," Proceedings of the IEEE, vol. 93, No. 6, Jun. 1, 2005, pp. 1073-1101.
Cleveland, F., "IEC TC57 Security Standards for the Power System's Information Infrastructure—Beyond Simple Encryption," May 21, 2006, pp. 1079-1087.
"D1100 SmartMesh Network Release 1.0 Engineering Software Specifications," Dust Networks, Dec. 17, 2011, 36 pages.
"D1100 SmartMesh Network Release 1.0 Engineering Software Specifications," Dust Networks, 36 pages.
"Multiple Interpenetrating MultiDiGraphs," Dust Incorporated, 12 pages. (Powerpoint).
"SmartMesh-XT CLI Commands Guide," Dust Networks, Inc., Jun. 27, 2007, 36 pages.
SmartMesh-XT KT1030/KT2135/KT2030 Evaluation Kit Guide, Dust Networks, Inc., Nov. 2, 2007, 58 pages.
"SmartMesh-XT M2135-2, M2030-2 2.4 GHz Wireless Analog/Digital/Serial Motes," Dust Networks, Inc., Mar. 28, 2007, 33 pages.
SmartMesh-XT Manager XML API Guide, Dust Networks, Inc., Apr. 4, 2007, 148 pages.
"System Description for Security Review SmartMesh Alba," Dust Networks, 36 pages.
Berlemann, Software Defined Protocols Based on Generic Protocol Functions for Wired and Wireless Networks, Nov, 2033, RWTH Aachen University.
Qu et al., "A web-enabled distributed control application platform for industrial automation", Emerging Technologies and Factory Automation, Proceedings, 2:129-32 (Sep. 16, 2003).
Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).
Zheng, "ZigBee wireless sensor network in industrial applications", SICE-ICCAS 2006 International Joint Conference, IEEE, New Jersey, pp. 1067-1070 (Oct. 1, 2006).
Chinese Office Action for 200880019599.6 mailed Dec. 13, 2011.
Almeroth et al., "A lightweight protocol for interconnecting heterogeneous devices in dynamic environments", Multimedia Computing and Systems, 1999, IEEE International Conference on Florence, Italy Jun. 7-11, 1999, Los Alamitos, CA, USA, IEEE Comput. Soc, US, vol. 2, Jun. 7, 1999, pp. 420-425, XP010519427.
Deering et al., "Internet Protocol, Version 6 (IPv6) Specification; rfc1883.txt", IETF Standard, Internet Engineering Task Force, IETF, CH, Dec. 1, 1995, XP015007667.
Office Action in European Patent Application No. 08826678.8 dated Jul. 12, 2013.
Egea-Lopez et al., A wireless sensor networks MAC protocol for real-time applications, Pers Ubiquit Comput, 12:111-112 (2008).
Kwon et al., Traffic adaptive IEEE 802.15.4 MAC for Wireless Sensor Networks, Lecture Notes in Computer Science (LNCS), 4096:864-873 (2006).

\* cited by examiner

COMBINED WIRED AND WIRELESS COMMUNICATIONS WITH FIELD DEVICES IN A PROCESS CONTROL ENVIRONMENT

CROSS-REFERENCE TO RELATED APPLICATIONS

This application is based on and claims the benefit of priority to U.S. Provisional Application No. 60/911,795, entitled "Routing, Scheduling, Reliable and Secure Operations in a Wireless Communication Protocol" filed Apr. 13, 2007, the entire disclosure of which is hereby expressly incorporated herein by reference.

FIELD OF TECHNOLOGY

The present invention relates generally to wireless communications in a process control environment and, more particularly, to a wireless gateway supporting a wireless communication protocol.

BACKGROUND

In the process control industry, it is known to use standardized communication protocols to enable devices made by different manufacturers to communicate with one another in an easy to use and implement manner. One such well known communication standard used in the process control industry is the Highway Addressable Remote Transmitter (HART) Communication Foundation protocol, referred to generally as the HARTS protocol. Generally speaking, the HART® protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

There has been a move, in the past number of years, to incorporate wireless technology into various industries including, in some limited manners, the process control industry. However, there are significant hurdles in the process control industry that limit the full scale incorporation, acceptance and use of wireless technology. In particular, the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236,334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

Similar to wired communications, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. Moreover, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In the process control industry, developers of wireless communication protocols face additional challenges, such as achieving backward compatibility with wired devices, supporting previous wired versions of a protocol, providing transition services to devices retrofitted with wireless communicators, and providing routing techniques which can ensure both reliability and efficiency. Meanwhile, there remains a wide number of process control applications in which there are few, if any, in-place measurements. Currently these applications rely on observed measurements (e.g. water level is rising) or inspection (e.g. period maintenance of air conditioning unit, pump, fan, etc) to discover abnormal situations. In order to take action, operators frequently require face-to-face discussions. Many of these applications could be greatly simplified if measurement and control devices were utilized. However, current measurement devices usually require power, communications infrastructure, configuration, and support infrastructure which simply is not available.

SUMMARY

A wireless network includes one or more field devices capable of wireless communication and a gateway connecting the wireless network to an external host operating in a process control environment. In some embodiments, the external host may be a node on another network. The one or more field devices and the gateway may form a wireless mesh network extending a plant automation network operating in the process control environment by providing bidirectional communications between each wireless device and at least one host operating in the plant automation network. In some embodiments, a host executing an application such as asset management, alarm diagnostic, etc. may access the wireless devices of the wireless network and wired devices connected to the plant automation network using a common communication scheme. In at least some of the embodiments, the host may regard the wireless network and the plant automation network as a single network having a common addressing scheme and a communication protocol.

In one aspect, a wireless adapter may connect to a wired device via a wired link and to the wireless network via a wireless link. The wireless adapter may acquire a unique address consistent with the addressing scheme of the wireless network to operate in the wireless network as one of the network nodes, thereby providing wireless capability to the wired device. In some embodiments, a single wireless adapter may connect to several wired devices. In a particular, a wired device may be a 4-20 mA device. In other embodiments, a wired device may be a wired HART device or another type of a smart field device. In at least some of the embodiments, a wired device may be connected to the wireless network via a wireless adapter without disconnecting the original wiring of the smart field device.

In another aspect, a wired device or a wireless device may join an operational wireless network without restarting or manually reconfiguring the network. In its initial configuration, a wireless network may include a gateway and a network manager running on the same host as the gateway or elsewhere within the plant automation network. Wireless devices and wired devices equipped with wireless adapters may join the network by processing advertisement messages and exchanging one or more messages with the network manager as part of a join sequence. In this sense, an operator may gradually build up a wireless network as a new installation as an upgrade of an existing wired network.

DETAILED DESCRIPTION OF THE DRAWINGS

FIG. 1 schematically illustrates a wireless network connected to a plant automation network via a wireless gateway of the present disclosure.

DETAILED DESCRIPTION

Figure 1:
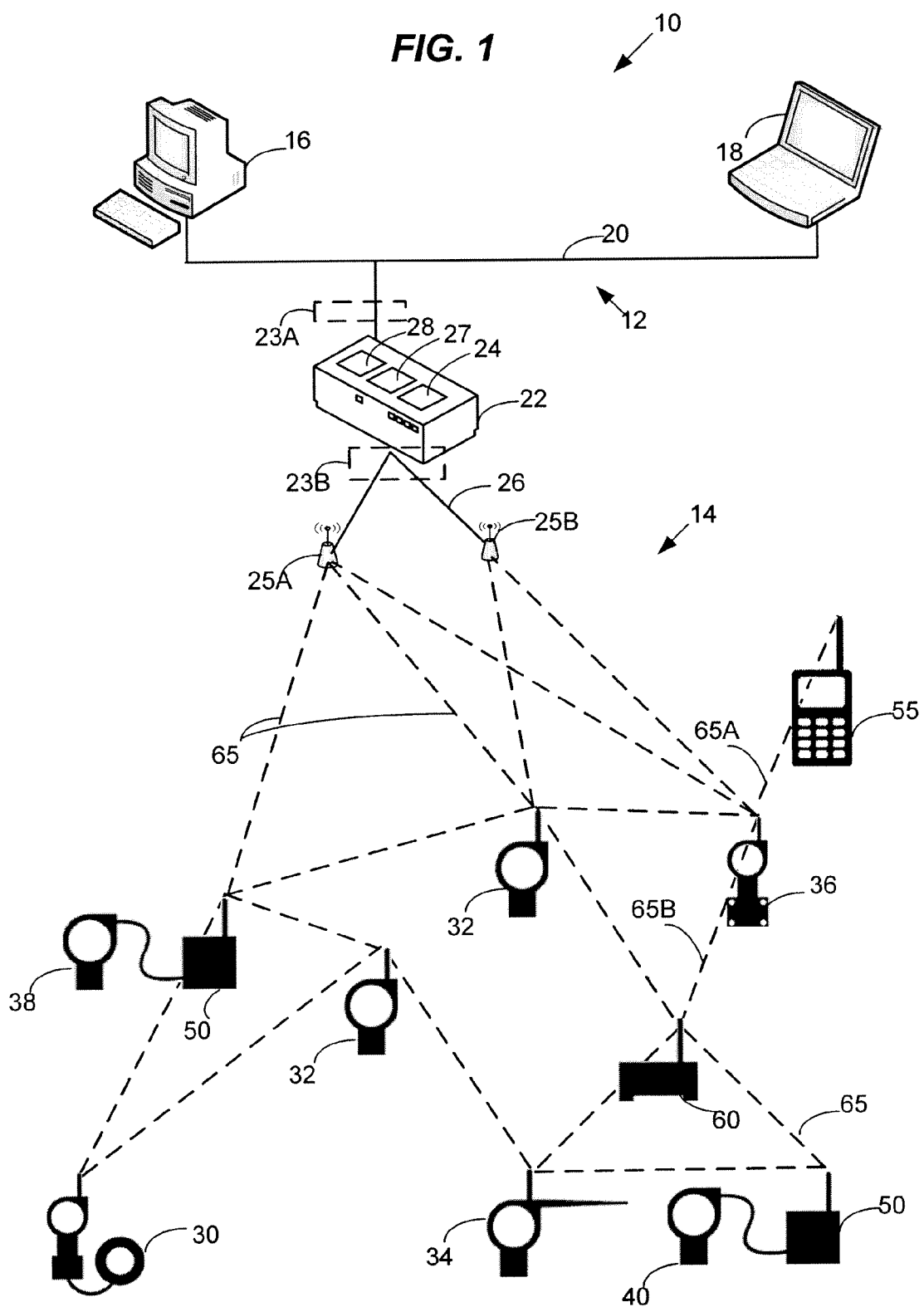

FIG. 1 illustrates an exemplary network 10 in which a wireless gateway described herein may be used. In particular, the network 10 may include a plant automation network 12 connected to a wireless communication network 14. The plant automation network 12 may include one or more stationary workstations 16 and one or more portable workstations 18 connected over a communication backbone 20 which may be implemented using Ethernet, RS-485, Profibus DP, or using other suitable communication hardware and protocol. The workstations and other equipment forming the plant automation network 12 may provide various control and supervisory functions to plant personnel, including access to devices in the wireless network 14. The plant automation network 12 and the wireless network 14 may be connected via a wireless gateway 22. More specifically, the wireless gateway 22 may be connected to the backbone 20 in a wired manner via a first (or "host") interface 23A and may communicate with the plant automation network 12 using any suitable (e.g., known) communication protocol. The second (or "wireless") interface 23B of the wireless gateway 22 may support wireless communications with one or several devices operating in the wireless network 14.

In operation, the wireless gateway 22, which may be implemented in any other desired manner (e.g., as a standalone device, a card insertable into an expansion slot of the host workstations 16 or 18, as a part of the input/output (IO) subsystem of a PLC-based or DCS-based system, etc.), may provide applications that are running on the network 12 with access to various devices of the wireless network 14. In some embodiments, the protocols servicing the network 12 and 14 may share one or more upper layers of the respective protocol stacks, and the wireless gateway 22 may provide the routing, buffering, and timing services to the lower layers of the protocol stacks (e.g., address conversion, routing, packet segmentation, prioritization, etc.) while tunneling the shared layer or layers of the protocol stacks. In other cases, the wireless gateway 22 may translate commands between the protocols of the networks 12 and 14 which do not share any protocol layers.

In addition to protocol and command conversion, the wireless gateway 22 may provide synchronized clocking used by time slots and superframes (sets of communication time slots spaced equally in time) of a scheduling scheme associated with a wireless protocol (referred to herein as a WirelessHART protocol) implemented in the network 14. In particular, the gateway 22 may propagate synchronization data through the wireless network 14 at predetermined intervals.

In some configurations, the network 10 may include more than one wireless gateway 22 to improve the efficiency and reliability of the network 10. In particular, multiple gateway devices 22 may provide additional bandwidth for the communication between the wireless network 14 and the plant automation network 12, as well as the outside world. On the other hand, the gateway 22 device may request bandwidth from the appropriate network service according to the gateway communication needs within the wireless network 14. A network manager software module 27, which may reside in the wireless gateway 22, may further reassess the necessary bandwidth while the system is operational. For example, the wireless gateway 22 may receive a request from a host residing outside of the wireless network 14 to retrieve a large amount of data. The wireless gateway 22 may then request the network manager 27 to allocate additional bandwidth to accommodate this transaction. For example, the wireless gateway 22 may issue an appropriate service request. The wireless gateway 22 may then request the network manager 27 to release the bandwidth upon completion of the transaction.

With continued reference to FIG. 1, the wireless network 14 may include one or more field devices 30-36. In general, process control systems, like those used in chemical, petroleum or other process plants, include field devices such as valves, valve positioners, switches, sensors (e.g., temperature, pressure and flow rate sensors), pumps, fans, etc. Generally speaking, field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adaptor (WHA) 50 or 50A. Additionally, the WHA 50 may support other communication protocols such as Foundation® Fieldbus, PROFIBUS, DeviceNet, etc. In these embodiments, the WHA 50 supports protocol translation on a lower layer of the protocol stack. Additionally, it is contemplated that a single WHA 50 may also function as a multiplexer and may support multiple HART or non-HART devices.

In general, the network manager 27 may be responsible for adapting the wireless network 14 to changing conditions and for scheduling communication resources. As network devices join and leave the network, the network manager 27 may update its internal model of the wireless network 14 and use this information to generate communication schedules and communication routes. Additionally, the network manager 27 may consider the overall performance of the wireless network 14 as well as the diagnostic information to adapt the wireless network 14 to changes in topology and communication requirements. Once the network manager 27 has generated the overall communication schedule, all or respective parts of the overall communication schedule may be transferred through a series of commands from the network manager 27 to the network devices.

To further increase bandwidth and improve reliability, the wireless gateway 22 may be functionally divided into a virtual gateway 24 and one or more network access points 25, which may be separate physical devices in wired communication with the wireless gateway 22. However, while FIG. 1 illustrates a wired connection 26 between the physically separate wireless gateway 22 and the access points 25, it will be understood that the elements 22-26 may also be provided as an integral device. Because the network access points 25 may be physically separated from the wireless gateway 22, the access points 25 may be strategically placed in several different locations with respect to the network 14. In addition to increasing the bandwidth, multiple access points 25 can increase the overall reliability of the network 14 by compensating for a potentially poor signal quality at one access point 25 using the other access point 25. Having multiple access points 25 also provides redundancy in case of a failure at one or more of the access points 25.

In addition to allocating bandwidth and otherwise bridging the networks 12 and 14, the wireless gateway 22 may perform one or more managerial functions in the wireless network 14. As illustrated in FIG. 1, a network manager software module 27 and a security manager software module 28 may be stored in and executed in the wireless gateway 22. Alternatively, the network manager 27 and/or the security manager 28 may run on one of the hosts 16 or 18 in the plant automation network 12. For example, the network manager 27 may run on the host 16 and the security manager 28 may run on the host 18. The network manager 27 may be responsible for configuration of the network 14, scheduling communication between wireless devices, managing routing tables associated with the wireless devices, monitoring the overall health of the wireless network 14, reporting the health of the wireless network 14 to the workstations 16 and 18, as well as other administrative and supervisory functions. Although a single active network manager 27 may be sufficient in the wireless network 14, redundant network managers 27 may be similarly supported to safeguard the wireless network 14 against unexpected equipment failures. Meanwhile, the security manager 28 may be responsible for protecting the wireless network 14 from malicious or accidental intrusions by unauthorized devices. To this end, the security manager 28 may manage authentication codes, verify authorization information supplied by devices attempting to join the wireless network 14, update temporary security data such as expiring secret keys, and perform other security functions.

With continued reference to FIG. 1, the wireless network 14 may include one or more field devices 30-36. In general, process control systems, like those used in chemical, petroleum or other process plants, include such field devices as valves, valve positioners, switches, sensors (e.g., temperature, pressure and flow rate sensors), pumps, fans, etc. Field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

In one embodiment, the wireless protocol supporting network devices 30-36 of the wireless network 14 is an extension of the known wired HART protocol, a widely accepted industry standard, that maintains the simple workflow and practices of the wired environment. In this sense, the network devices 30-36 may be considered WirelessHART devices. The same tools used for wired HART devices may be easily adapted to wireless devices 30-36 with a simple addition of new device description files. In this manner, the wireless protocol may leverage the experience and knowledge gained using the wired HART protocol to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, reduces the cost associated with developing and supporting devices that may be used with such networks. Some of the additional benefits of a wireless extension of the well-known HART protocol include access to measurements that were difficult or expensive to obtain with wired devices and the ability to configure and operate instruments from system software that can be installed on laptops, handhelds, workstations, etc. Another benefit is the ability to send diagnostic alerts from wireless devices back through the communication infrastructure to a centrally located diagnostic center. For example, every heat exchanger in a process plant could be fitted with a WirelessHART device and the end user and supplier could be alerted when a heat exchanger detects a problem. Yet another benefit is the ability to monitor conditions that present serious health and safety problems. For example, a WirelessHART device could be placed in flood zones on roads and be used to alert authorities and drivers about water levels. Other benefits include access to a wide range of diagnostics alerts and the ability to store trended as well as calculated values at the WirelessHART devices so that, when communications to the device are established, the values can be transferred to a host. In this manner, the WirelessHART protocol can provide a platform that enables host applications to have wireless access to existing HART-enabled field devices and the WirelessHART protocol can support the deployment of battery operated, wireless only HART-enabled field devices. The WirelessHART protocol may be used to establish a wireless communication standard for process applications and may further extend the application of HART communications and the benefits that this protocol provides to the process control industry by enhancing the basic HART technology to support wireless process automation applications.

Referring again to FIG. 1, the field devices 30-36 may be WirelessHART field devices, each provided as an integral unit and supporting all layers of the WirelessHART protocol stack. For example, in the network 14, the field device 30 may be a WirelessHART flow meter, the field devices 32 may be WirelessHART pressure sensors, the field device 34 may be a WirelessHART valve positioner, and the field device 36 may a WirelessHART pressure sensor. Importantly, the wireless devices 30-36 may support all of the HART features that users have come to expect from the wired HART protocol. As one of ordinary skill in the art will appreciate, one of the core strengths of the HART protocol is its rigorous interoperability requirements. In some embodiments, all WirelessHART equipment includes core mandatory capabilities in order to allow equivalent device types (made by different manufacturers, for example) to be interchanged without compromising system operation. Furthermore, the WirelessHART protocol is backward compatible to HART core technology such as the device description language (DDL). In the preferred embodiment, all of the WirelessHART devices should support the DDL, which ensures that end users immediately have the tools to begin utilizing the WirelessHART protocol.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adaptor (WHA) 50. Additionally, the WHA 50 may support other communication protocols such as FOUNDATION® Fieldbus, PROFIBUS, DeviceNet, etc. In these embodiments, the WHA 50 supports protocol translation on a lower layer of the protocol stack. Additionally, it is contemplated that a single WHA 50 may also function as a multiplexer and may support multiple HART or non-HART devices.

Plant personnel may additionally use handheld devices for installation, control, monitoring, and maintenance of network devices. Generally speaking, handheld devices are portable equipment that can connect directly to the wireless network 14 or through the gateway devices 22 as a host on the plant automation network 12. As illustrated in FIG. 1, a WirelessHART-connected handheld device 55 may communicate directly with the wireless network 14. When operating with a formed wireless network 14, the handheld device 55 may join the network 14 as just another WirelessHART field device. When operating with a target network device that is not connected to a WirelessHART network, the handheld device 55 may operate as a combination of the wireless gateway 22 and the network manager 27 by forming its own wireless network with the target network device.

A plant automation network-connected handheld device (not shown) may be used to connect to the plant automation network 12 through known networking technology, such as Wi-Fi. This device communicates with the network devices 30-40 through the wireless gateway 22 in the same fashion as external plant automation servers (not shown) or the workstations 16 and 18 communicate with the devices 30-40.

Additionally, the wireless network 14 may include a router device 60 which is a network device that forwards packets from one network device to another network device. A network device that is acting as a router device uses internal routing tables to conduct routing, i.e., to decide to which network device a particular packet should be sent. Standalone routers such as the router 60 may not be required in those embodiments where all of the devices on the wireless network 14 support routing. However, it may be beneficial (e.g. to extend the network, or to save the power of a field device in the network) to add one or more dedicated routers 60 to the network 14.

All of the devices directly connected to the wireless network 14 may be referred to as network devices. In particular, the wireless field devices 30-36, the adapters 50, the routers 60, the gateway devices 22, the access points 25, and the wireless handheld device 55 are, for the purposes of routing and scheduling, network devices, each of which forms a node of the wireless network 14. In order to provide a very robust and an easily expandable wireless network, all of the devices in a network may support routing and each network device may be globally identified by a substantially unique address, such as a HART address, for example. The network manager 27 may contain a complete list of network devices and may assign each device a short, network unique 16-bit (for example) nickname. Additionally, each network device may store information related to update (or "scan") rates, connection sessions, and device resources. In short, each network device maintains up-to-date information related to routing and scheduling within the wireless network 14. The network manager 27 may communicate this information to network devices whenever new devices join the network or whenever the network manager 27 detects or originates a change in topology or scheduling of the wireless network 14.

Further, each network device may store and maintain a list of neighbor devices that the network device has identified during listening operations. Generally speaking, a neighbor of a network device is another network device of any type potentially capable of establishing a connection with the network device in accordance with the standards imposed by a corresponding network. In case of the WirelessHART network 14, the connection is a direct wireless connection. However, it will be appreciated that a neighboring device may also be a network device connected to the particular device in a wired manner. As will be discussed later, network devices may promote their discovery by other network devices through advertisement, or special messages sent out during designated periods of time. Network devices operatively connected to the wireless network 14 have one or more neighbors which they may choose according to the strength of the advertising signal or to some other principle.

In the example illustrated in FIG. 1, each of a pair of network devices connected by a direct wireless connection 65 recognizes the other as a neighbor. Thus, network devices of the wireless network 14 may form a large number of inter-device connections 65. The possibility and desirability of establishing a direct wireless connection 65 between two network devices is determined by several factors, such as the physical distance between the nodes, obstacles between the nodes (devices), signal strength at each of the two nodes, etc. In general, each wireless connection 65 is characterized by a large set of parameters related to the frequency of transmission, the method of access to a radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (e.g., 2.4 GHz). While the system and method discussed herein may be applied to a wireless network operating on any designated frequency or range of frequencies, the example embodiment discussed below relates to the wireless network 14 operating in the unlicensed, or shared part of the radio spectrum. In accordance with this embodiment, the wireless network 14 may be easily activated and adjusted to operate in a particular unlicensed frequency range as needed.

With continued reference to FIG. 1, two or more direct wireless connections 65 may form a communication path between nodes that cannot form a direct wireless connection 65. For example, the direct wireless connection 65A between the WirelessHART hand-held device 55 and WirelessHART device 36, along with the direct wireless connection 65B between the WirelessHART device 36 and the router 60, may form a communication path between the devices 55 and 60. As discussed in greater detail below, at least some of the communication paths may be directed communication paths (i.e., permitting or defining data transfer in only one direction between a pair of devices). Meanwhile, the WirelessHART device 36 may directly connect to each of the network devices 55, 60, 32, and to the network access points 25A and 25B. In general, network devices operating in the wireless network 14 may originate data packets, relay data packets sent by other devices, or perform both types of operations. As used herein, the term "end device" refers to a network device that does not relay data packets sent by other devices and term "routing device" refers to a network device that relays data packets traveling between other network devices. Of course, a routing device may also originate its own data or in some cases be an end device. One or several end devices and routing devices, along with several direct connections 65, may thus form a part of a mesh network.

Because a process plant may have hundreds or even thousands of field devices, the wireless network 14 operating in the plant may include a large number of nodes and, in many cases, an even larger number of direct connections 65 between pairs of nodes. As a result, the wireless network 14 may have a complex mesh topology, and some pairs of devices that do not share a direct connection 65 may have to communicate through many intermediate hops to perform communications between these devices. Thus, a data packet may sometimes need to travel along many direct connections 65 after leaving a source device but before reaching a destination device, and each direct connection 65 may add a delay to the overall delivery time of the data packet. Moreover, some of these intermediate devices may be located at an intersection of many communication paths of a mesh network. As such, these devices may be responsible for relaying a large number of packets originated by many different devices, possibly in addition to originating its own data. Consequently, a relatively busy intermediate device may not forward a transient data packet immediately, and instead may queue the packet for a relatively significant amount of time prior to sending the packet to a next node in the corresponding communication path. When the data packet eventually reaches the destination device, the destination device may reply with an acknowledgement packet which may also encounter similar delays. During the time the packet travels to the destination device and the corresponding acknowledgment packet travels back to the originating device from the destination device, the originating node may not know whether the data packet has successfully reached the destination device. Moreover, devices may leave the wireless network 14 due to scheduled maintenance and upgrades or due to unexpected failures, thus changing the topology of the mesh network and destroying some of the communication paths. Similarly, the devices may join the wireless network 14, adding additional direct connections 65. These and other changes to the topology of the wireless network 14 may significantly impact data transmissions between pairs of nodes if not processed in an efficient and timely manner.

Importantly, however, the efficiency of delivering data packets may largely determine the reliability, security, and the overall quality of plant operations. For example, a data packet including measurements indicative of an excessive temperature of a reactor should quickly and reliably reach another node, such as the hand-held device 55 or even the workstation 16, so that the operator or a controller may immediately take the appropriate action and address a dangerous condition if necessary. To efficiently utilize the available direct wireless connections 65 and properly adjust to the frequently changing network topology, the network manager 27 may maintain a complete network map 68, define a routing scheme that connects at least some pairs of network devices 30-50, and communicate the relevant parts of the routing scheme to each network device that participates in the routing scheme.

In particular, the network manager 27 may define a set of directed graphs including one or more unidirectional communication paths, assign a graph identifier to each defined directed graph, and may communicate a relevant part of each graph definition to each corresponding network device, which may then update the device-specific, locally stored connection table 69. As explained in more detail below, the network devices 30-50 may then route data packets based on the graph identifier included in the headers, trailers, etc. of the data packets. If desired, each connection table 69 may only store routing information directly related to the corresponding network device, so that the network device does not know the complete definition of a directed graph which includes the network device. In other words, the network device may not "see" the network beyond its immediate neighbors and, in this sense, the network device may be unaware of the complete topology of the wireless network 14. For example, the router device 60 illustrated in FIG. 1 may store a connection table 69A, which may only specify the routing information related to the neighboring network devices 32, 36, 50, and 34. Meanwhile, the WHA 50A may store a connection table 69B, which accordingly may specify the routing information related to the neighbors of the WHA 50A.

In some cases, the network manager 27 may define duplicate communication paths between pairs of network devices to ensure that a data packet may still reach the destination device along the secondary communication path if one of the direct connections 65 of the primary communication path becomes unavailable. However, some of the direct connections 65 may be shared between the primary and the secondary path of a particular pair of network devices. Moreover, the network manager 27 may, in some cases, communicate the entire communication path to be used to a certain network device, which may then originate a data packet and include the complete path information in the header or the trailer of the data packet. Preferably, network devices use this method of routing for data which does not have stringent latency requirements. As discussed in detail below, this method (referred to herein as "source routing") may not provide the same degree of reliability and flexibility and, in general, may be characterized by longer delivery delays.

Another one of the core requirements of a wireless network protocol (and particularly of a wireless network operating in an unlicensed frequency band) is the minimally disruptive coexistence with other equipment utilizing the same band. Coexistence generally defines the ability of one system to perform a task in a shared environment in which other systems can similarly perform their tasks while conforming to the same set of rules or to a different (and possibly unknown) set of rules. One requirement of coexistence in a wireless environment is the ability of the protocol to maintain communication while interference is present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the particular system may ask what impact the transmitted signal of one transmitter has on other radio system operating in proximity to the particular system. More specifically, the operator may ask whether the transmitter disrupts communication of some other wireless device every time the transmitter turns on or whether the transmitter spends excessive time on the air effectively "hogging" the bandwidth. Ideally, each transmitter should be a "silent neighbor" that no other transmitter notices. While this ideal characteristic is rarely, if ever, attainable, a wireless system that creates a coexistence environment in which other wireless communication systems may operate reasonably well may be called a "good neighbor." The second aspect of coexistence of a wireless system is the ability of the system to operate reasonably well in the presence of other systems or wireless signal sources. In particular, the robustness of a wireless system may depend on how well the wireless system prevents interference at the receivers, on whether the receivers easily overload due to proximate sources of RF energy, on how well the receivers tolerate an occasional bit loss, and similar factors. In some industries, including the process control industry, there are a number of important potential applications in which the loss of data is frequently not allowable. A wireless system capable of providing reliable communications in a noisy or dynamic radio environment may be called a "tolerant neighbor."

Effective coexistence (i.e., being a good neighbor and a tolerant neighbor) relies in part on effectively employing three aspects of freedom: time, frequency and distance. Communication can be successful when it occurs 1) at a time when the interference source (or other communication system) is quiet; 2) at a different frequency than the interference signal; or 3) at a location sufficiently removed from the interference source. While a single one of these factors could be used to provide a communication scheme in the shared part of the radio spectrum, a combination of two or all three of these factors can provide a high degree of reliability, security and speed.

Still referring to FIG. 1, the network manager 27 or another application or service running on the network 14 or 12 may define a master network schedule 67 for the wireless communication network 14 in view of the factors discussed above. The master network schedule 67 may specify the allocation of resources such as time segments and radio frequencies to the network devices 25 and 30-55. In particular, the master network schedule 67 may specify when each of the network devices 25 and 30-55 transmits process data, routes data on behalf of other network devices, listens to management data propagated from the network manager 27, and transmits advertisement data for the benefit of devices wishing to join the wireless network 14. To allocate the radio resources in an efficient manner, the network manager 27 may define and update the master network schedule 67 in view of the topology of the wireless network 14. More specifically, the network manager 27 may allocate the available resources to each of the nodes of the wireless network 14 (i.e., wireless devices 30-36, 50, and 60) according to the direct wireless connections 65 identified at each node. In this sense, the network manager 27 may define and maintain the network schedule 67 in view of both the transmission requirements and of the routing possibilities at each node.

The master network schedule 67 may partition the available radio sources into individual communication channels, and further measure transmission and reception opportunities on each channel in such units as Time Division Multiple Access (TDMA) communication timeslots, for example. In particular, the wireless network 14 may operate within a certain frequency band which, in most cases, may be safely associated with several distinct carrier frequencies, so that communications at one frequency may occur at the same time as communications at another frequency within the band. One of ordinary skill in the art will appreciate that carrier frequencies in a typical application (e.g., public radio) are sufficiently spaced apart to prevent interference between the adjacent carrier frequencies. For example, in the 2.4 GHz band, IEEE assigns frequency 2.455 to channel number 21 and frequency 2.460 to channel number 22, thus allowing the spacing of 5 KHz between two adjacent segments of the 2.4 GHz band. The master network schedule 67 may thus associate each communication channel with a distinct carrier frequency, which may be the center frequency in a particular segment of the band.

Meanwhile, as typically used in the industries utilizing TDMA technology, the term "timeslot" refers to a segment of a specific duration into which a larger period of time is divided to provide a controlled method of sharing. For example, a second may be divided into 10 equal 100 millisecond timeslots. Although the master network schedule 67 preferably allocates resources as timeslots of a single fixed duration, it is also possible to vary the duration of the timeslots, provided that each relevant node of the wireless network 14 is properly notified of the change. To continue with the example definition of ten 100-millisecond timeslots, two devices may exchange data every second, with one device transmitting during the first 100 ms period of each second (i.e., the first timeslot), the other device transmitting during the fourth 100 ms period of each second (i.e., the fourth timeslot), and with the remaining timeslots being unoccupied. Thus, a node on the wireless network 14 may identify the scheduled transmission or reception opportunity by the frequency of transmission and the timeslot during which the corresponding device may transmit or receive data.

As part of defining an efficient and reliable network schedule 67, the network manager 27 may logically organize timeslots into cyclically repeating sets, or superframes. As used herein, a superframe may be more precisely understood as a series of equal superframe cycles, each superframe cycle corresponding to a logical grouping of several adjacent time slots forming a contiguous segment of time. The number of time slots in a given superframe defines the length of the superframe and determines how often each time slot repeats. In other words, the length of a superframe, multiplied by the duration of a single timeslot, specifies the duration of a superframe cycle. Additionally, the timeslots within each frame cycle may be sequentially numbered for convenience. To take one specific example, the network manager 27 may fix the duration of a timeslot at 10 milliseconds and may define a superframe of length 100 to generate a one-second frame cycle (i.e., 10 milliseconds multiplied by 100). In a zero-based numbering scheme, this example superframe may include timeslots numbered 0, 1, . . . 99.

As discussed in greater detail below, the network manager 27 reduces latency and otherwise optimizes data transmissions by including multiple concurrent superframes of different sizes in the network schedule 67. Moreover, some or all of the superframes of the network schedule 67 may span multiple channels, or carrier frequencies. Thus, the master network schedule 67 may specify the association between each timeslot of each superframe and one of the available channels.

Thus, the master network schedule 67 may correspond to an aggregation of individual device schedules. For example, a network device, such as the valve positioner 34, may have an individual device schedule 67A. The device schedule 67A may include only the information relevant to the corresponding network device 34. Similarly, the router device 60 may have an individual device schedule 67B. Accordingly, the network device 34 may transmit and receive data according to the device schedule 67A without knowing the schedules of other network devices such as the schedule 69B of the device 60. To this end, the network manager 27 may manage both the overall network schedule 67 and each of the individual device schedules 67 (e.g., 67A and 67B) and communicate the individual device schedules 67 to the corresponding devices when necessary. Of course the device schedules 67A and 67B are subsets of and are derived from the overall or master network schedule 67. In other embodiments, the individual network devices 25 and 35-50 may at least partially define or negotiate the device schedules 67 and report these schedules to the network manager 27. According to this embodiment, the network manager 27 may assemble the network schedule 67 from the received device schedules 67 while checking for resource contention and resolving potential conflicts.

Figure 2:
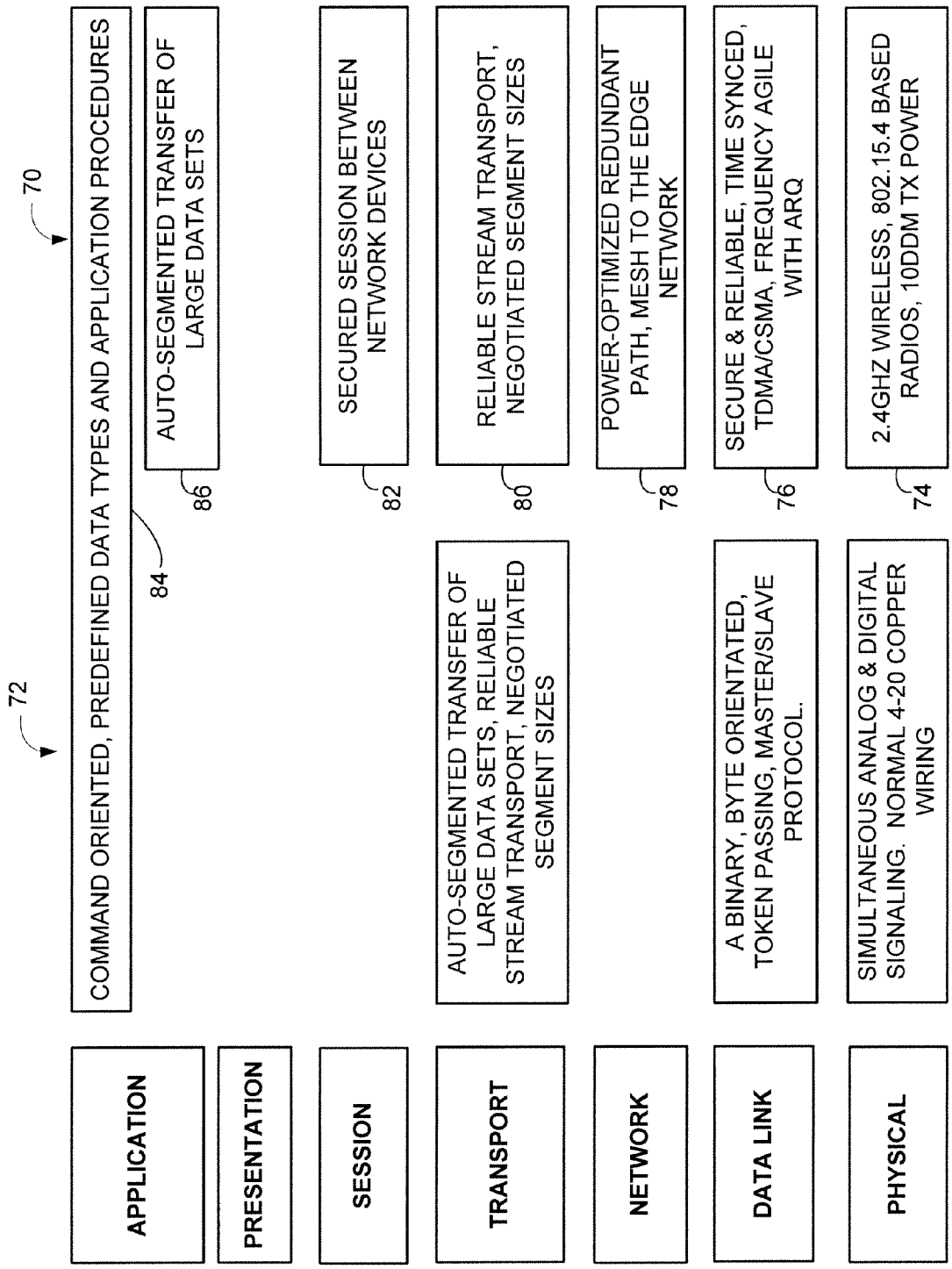
FIG. 2 is a schematic representation of the layers of a wireless HART protocol which may be used in the wireless network illustrated in FIG. 1.

The communication protocol supporting the wireless network 14 generally described above is referred to herein as the WirelessHART protocol 70, and the operation of this protocol is discussed in more detail with respect to FIG. 2. As will be understood, each of the direct wireless connections 65 may transfer data according to the physical and logical requirements of the WirelessHART protocol 70. Meanwhile, the WirelessHART protocol 70 may efficiently support communications within timeslots and on the carrier frequencies associated with the superframes defined by the device-specific schedules 69.

FIG. 2 schematically illustrates the layers of one example embodiment of the WirelessHART protocol 70, approximately aligned with the layers of the well-known ISO/OSI 7-layer model for communications protocols. By way of comparison, FIG. 2 additionally illustrates the layers of the existing "wired" HART protocol 72. It will be appreciated that the WirelessHART protocol 70 need not necessarily have a wired counterpart. However, as will be discussed in detail below, the WirelessHART protocol 70 can significantly improve the convenience of its implementation by sharing one or more upper layers of the protocol stack with an existing protocol. As indicated above, the WirelessHART protocol 70 may provide the same or greater degree of reliability and security as the wired protocol 72 servicing a similar network. At the same time, by eliminating the need to install wires, the WirelessHART protocol 70 may offer several important advantages, such as the reduction of cost associated with installing network devices, for example. It will be also appreciated that although FIG. 2 presents the WirelessHART protocol 70 as a wireless counterpart of the HART protocol 72, this particular correspondence is provided herein by way of example only. In other possible embodiments, one or more layers of the WirelessHART protocol 70 may correspond to other protocols or, as mentioned above, the WirelessHART protocol 70 may not share even the uppermost application layer with any existing protocols.

As illustrated in FIG. 2, the wireless expansion of HART technology may add at least one new physical layer (e.g., the IEEE 802.15.4 radio standard) and two data-link layers (e.g., wired and wireless mesh) to the known wired HART implementation. In general, the WirelessHART protocol 70 may be a secure, wireless mesh networking technology operating in the 2.4 GHz ISM radio band (block 74). In one embodiment, the WirelessHART protocol 70 may utilize IEEE 802.15.4b compatible direct sequence spread spectrum (DSSS) radios with channel hopping on a transaction by transaction basis. This WirelessHART communication may be arbitrated using TDMA to schedule link activity (block 76). As such, all communications are preferably performed within a designated time slot. One or more source and one or more destination devices may be scheduled to communicate in a given slot, and each slot may be dedicated to communication from a single source device, or the source devices may be scheduled to communicate using a CSMA/CA-like shared communication access mode. Source devices may send messages to one or more specific target devices or may broadcast messages to all of the destination devices assigned to a slot.

Because the WirelessHART protocol 70 described herein allows deployment of mesh topologies, a significant network layer 78 may be specified as well. In particular, the network layer 78 may enable establishing direct wireless connections 65 between individual devices and routing data between a particular node of the wireless network 14 (e.g., the device 34) and the gateway 22 via one or more intermediate hops. In some embodiments, pairs of network devices 30-50 may establish communication paths including one or several hops while in other embodiments, all data may travel either upstream to the wireless gateway 22 or downstream from the wireless gateway 22 to a particular node.

To enhance reliability, the WirelessHART protocol 70 may combine TDMA with a method of associating multiple radio frequencies with a single communication resource, e.g., channel hopping. Channel hopping provides frequency diversity which minimizes interference and reduces multi-path fading effects. In particular, the data link 76 may create an association between a single superframe and multiple carrier frequencies which the data link layer 76 cycles through in a controlled and predefined manner. For example, the available frequency band of a particular instance of the WirelessHART network 14 may have carrier frequencies $F_1, F_2, \ldots F_n$. A relative frame R of a superframe S may be scheduled to occur at a frequency $F_2$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link layer 76 of the WirelessHART protocol 70 may offer an additional feature of channel blacklisting, which restricts the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the WirelessHART network 14. In some embodiments, the WirelessHART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple WirelessHART networks 14, the network manager 27 may create an overall schedule for each instance of the WirelessHART network 14. The schedule may be organized into superframes containing time slots numbered relative to the start of the superframe. Additionally, the network manager 27 may maintain a global absolute slot count which may reflect the total of number of time slots scheduled since the start-up of the WirelessHART network 14. This absolute slot count may be used for synchronization purposes.

The WirelessHART protocol 70 may further define links or link objects in order to logically unite scheduling and routing. In particular, a link may be associated with a specific network device, a specific superframe, a relative slot number, one or more link options (transmit, receive, shared), and a link type (normal, advertising, discovery). As illustrated in FIG. 2, the data link layer 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

With continued reference to FIG. 2, the transport layer 80 of the WirelessHART protocol 70 allows efficient, best-effort communication and reliable, end-to-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis. In contrast, reliable communications allow devices to send acknowledgement packets. In addition to guaranteeing data delivery, the transport layer 80 may order packets sent between network devices. This approach may be preferable for request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the WirelessHART network 14 to activate a new superframe. Alternatively, a field device such as the sensor 30 may generate a packet and propagate the request to another field device such as to the handheld device 55, which may be a portable HART communicator. As another example, an alarm or event generated by the field device 34 may be transmitted as a request directed to the wireless gateway 22. In response to successfully receiving this request, the wireless gateway 22 may generate a response packet and send the response packet to the device 34, acknowledging receipt of the alarm or event notification.

Referring again to FIG. 2, the session layer 82 may provide session-based communications between network devices. End-to-end communications may be managed on the network layer by sessions. A network device may have more than one session defined for a given peer network device. If desired, almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the WirelessHART protocol 70 and the wired HART protocol 72 may support a common HART application layer 84. The application layer of the WirelessHART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Figure 3:
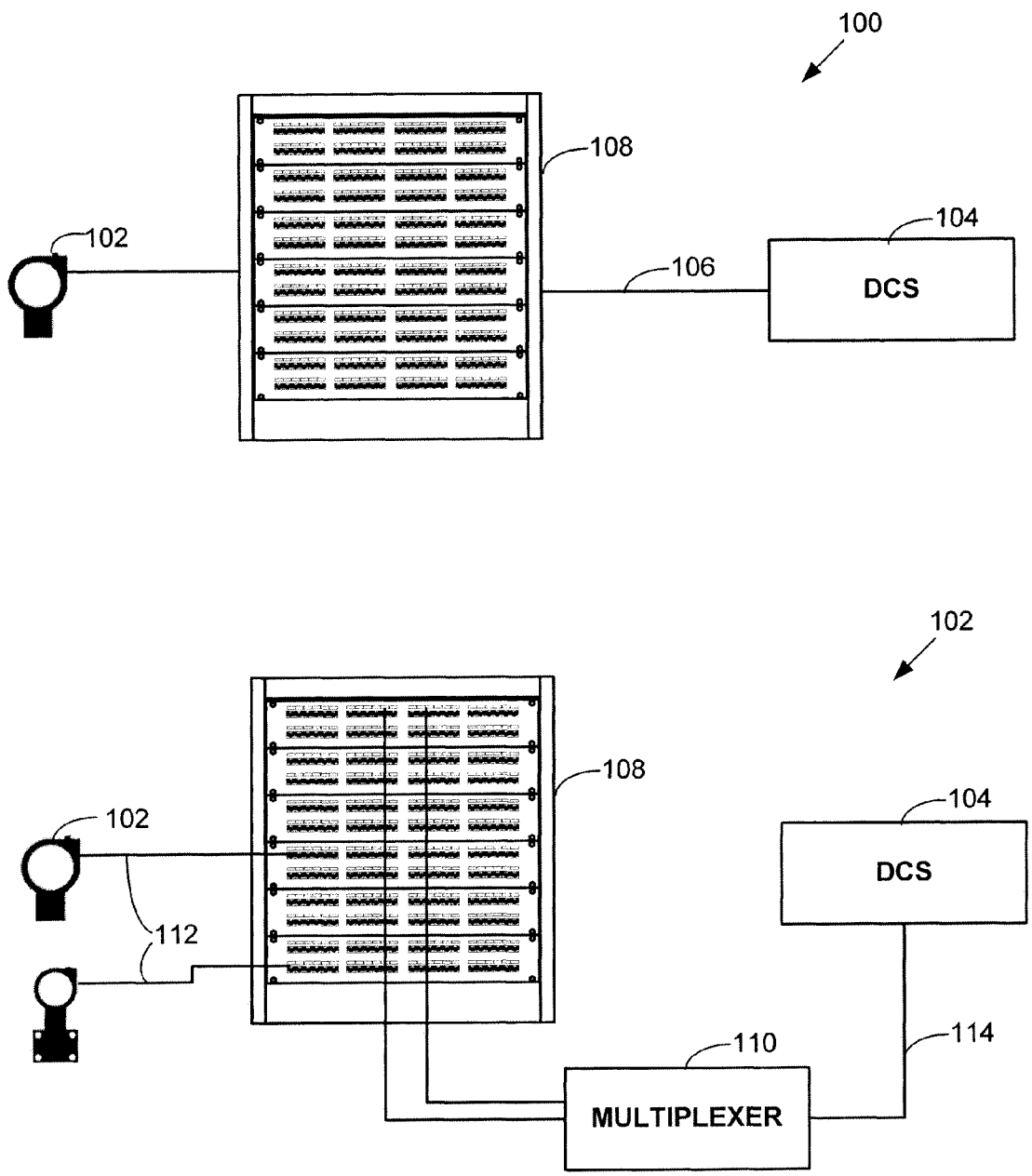
FIG. 3 is a block diagram illustrating the use of a multiplexer to support HART communications with a legacy field device.
Figure 4:
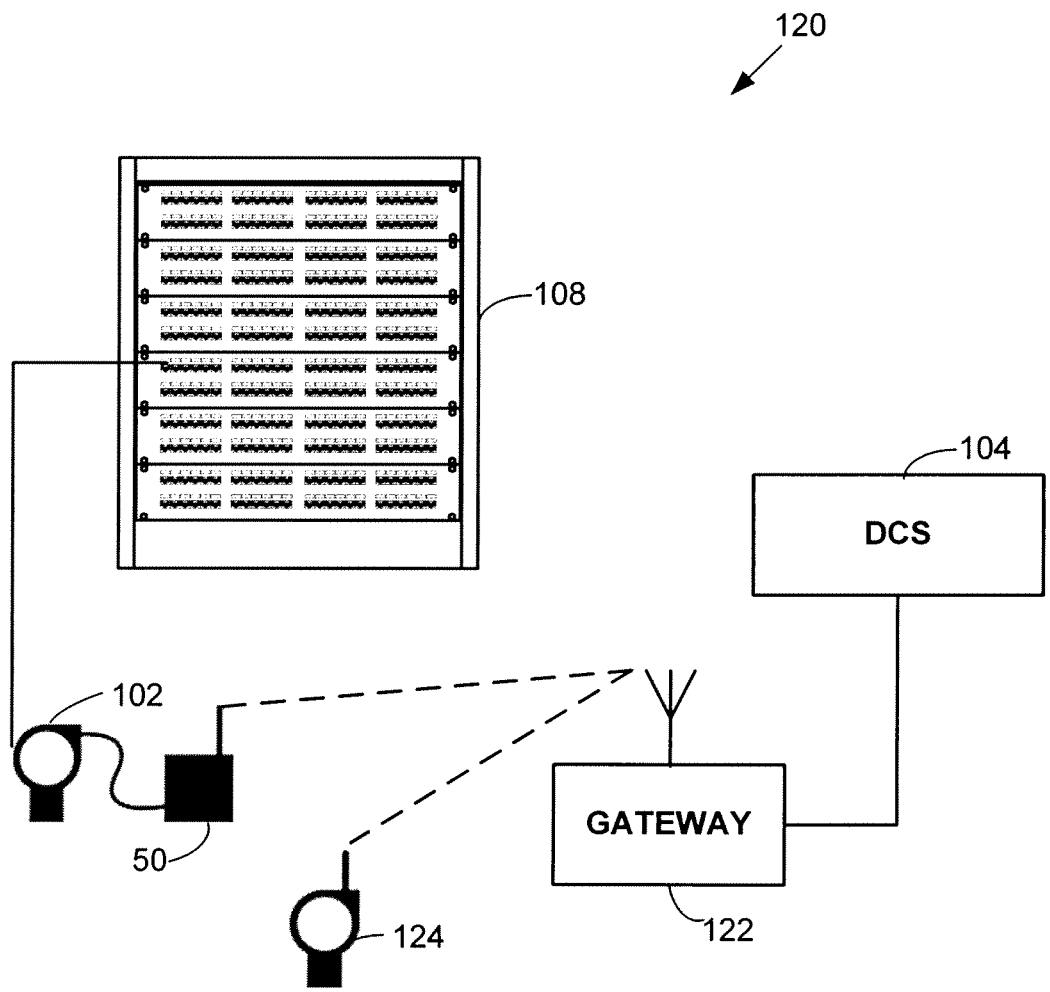
FIG. 4 is a block diagram illustrating the use of a wireless HART adaptor for supporting wireless HART communications with the legacy field device illustrated in FIG. 2.

FIGS. 3 and 4 illustrate some of the advantages of a wireless HART approach to building or extending process control networks. In particular, FIG. 3 contrasts a legacy approach to reporting process variables schematically represented in configuration 100 to a wired HART approach represented in a configuration 102. FIG. 4 further illustrates some of the additional advantages of an approach using a wireless extension of HART.

Referring to FIG. 3, a hardwired 4-20 mA instrument 102, which may be a Coriolis flowmeter, can only report a single process variable to a Distributed Control System (DCS) 104 via a wired connection 106 which typically passes through a marshalling cabinet 108. For example, the instrument 102 may report a flow rate measurement to the DCS 104. With the introduction of the HART standard, it became possible to report multiple variables over a single pair of electrical wires and, moreover, the introduction of a HART multiplexer 110 provided support for 4-20 mA devices. In particular, each of several inputs of the HART multiplexer 110 may be used for a separate hardwired connection 112 to a separate loop for measuring flow rate, density, temperature, etc. The HART multiplexer 110 may then report these multiple variables to the DCS 104 via a wired connection 114. However, while an input module or a multiplexing device such as the HART multiplexer 110 may allow the DCS 104 to communicate with several legacy field devices using a single connection 112, retrofitting such legacy equipment may be difficult, expensive, and time consuming. To take one example, the use of the HART multiplexer 110 still requires re-wiring of the marshalling cabinet 108 and adding a hardwired connection 112 for each loop.

On the other hand, FIG. 4 illustrates a more advantageous configuration 120 which may rely on the wireless HART protocol 70. As briefly indicated above, a wireless HART adapter 50 may work in cooperation with an existing instrument (e.g., positioner, transmitter, etc.) to support the 4-20 mA signaling standard while providing access to the set of process variables consistent with the HART standard. Thus, the configuration 110 may be updated to the configuration 120 while leaving the marshalling cabinet 108 intact. More specifically, the wireless HART adaptor 50 may connect to the field device 102 in a wired manner and establish a wireless connection with a gateway 122, which may also communicate with one or more wireless HART devices 124. Thus, wireless HART field devices, adapters, and gateways may allow plant operators to upgrade an existing network in a cost-effective manner (i.e., add a wireless HART adapter to a legacy device) as well as extend an existing network by using wireless HART devices such as the device 124 in the same network as wired HART devices (not shown) and legacy devices such as 4-20 mA equipment. Of course, wired plant automation networks may also include devices using other protocols such as Foundation Fieldbus, Profibus DP, etc., and it will be noted that the components 50 and 122 may similarly extend and upgrade other networks. For the sake of clarity, all such networks are referred to herein as "legacy networks."

It will be also noted that instruments with built-in wireless HART capability provide the additional advantage that these devices could be self-powered (e.g., battery-powered, solar powered, etc.). Among other advantages of the wireless approach are the ability to add multivariable data access to individual instruments as required, the elimination of the need to re-wire marshalling cabinets to accommodate HART multiplexers, and the possibility of maintaining primary measurements on a 4-20 mA signaling line while accessing secondary process measurements via the wireless HART adapter 50. Further, a host such as the workstation 16 (see FIG. 1) may use standard HART commands to read the necessary process values (universal commands) from a network device wirelessly coupled to the wireless HART network 14. Still further, a user can access all the device functions available via the HART commands, including for example, diagnostic messages, or remotely upload and download device configuration.

Figure 5:
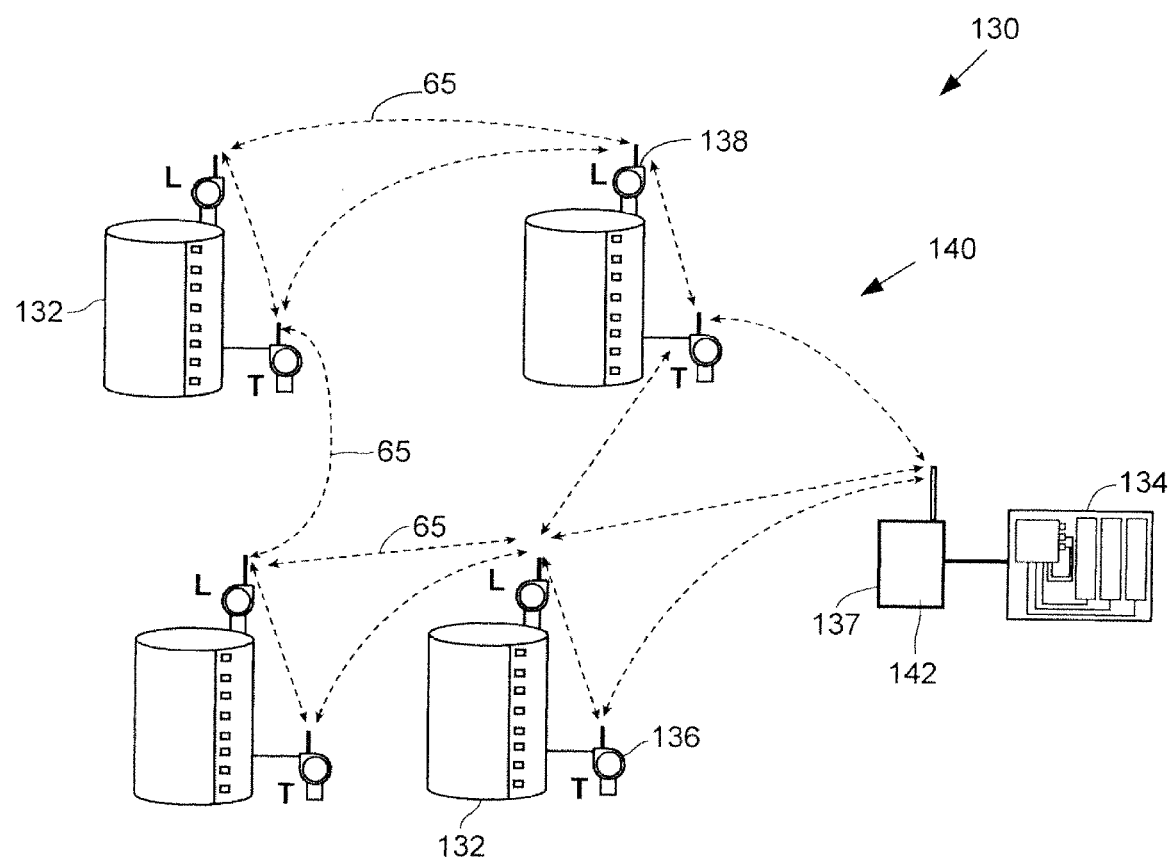
FIG. 5 illustrates a specific example of providing wireless communications between field devices in a tank farm and accessing the resulting mesh network from a distributed control system using a wireless gateway of the present disclosure.

FIG. 5 provides a specific example of forming a wireless mesh network in a tank farm 130 to further illustrate an application of the wireless gateway described herein. In this particular example, the tank farm 130 may utilize several WirelessHART devices for level monitoring. More specifically, the tank farm 130 contains several tanks 132 as part of an existing installation. One of ordinary skill in the art will appreciate that in order to add gauging or monitoring capability to the tank farm 130 and to make every tank 132 visible to a DCS 134, the currently known solutions require running cables to each tank to connect newly installed meters or sensors. Without sufficient spare capacity within the existing cable runs, this operation may be an expensive and time-consuming option. On the other hand, the wireless solution described herein could utilize self-powered instruments to report the new process measurements. These measurements could come, for example, from wireless contact temperature monitoring devices 136 which are simple to fit. Moreover, because the engineers, technicians, and other plant operators servicing the tank farm 130 would not need to run cables or purchase and install controller input modules, the resulting cost saving could make it economically viable to add several process measurement points to improve process visibility. For example, plant operators may additionally add pressure sensors 138 to each tank. The pressure sensors 138, the wireless contact temperature monitoring devices 136, a wireless gateway 137, and additional wireless devices not shown in FIG. 5 may thus form a wireless network 140.

As generally discussed above in reference to FIG. 1, it is important to consider the location of the wireless devices on each tank 132 so that the wireless network 140 can form an efficient and reliable mesh arrangement. In some cases, it may be necessary to add routers 60 in those locations where plant equipment could block or seriously affect a wireless connection. Thus, in this and in similar situations, it is desirable that the wireless network 140 be "self-healing," i.e., capable of automatically addressing at least some of the delivery failures. To meet this and other design requirements, the wireless network 140 may define redundant paths and schedules so that in response to detecting a failure of one or more direct wireless connections 65, the network 14 may route data via an alternate route. Moreover, the paths may be added and deleted without shutting down or restarting the wireless network 140. Because some of the obstructions or interference sources in many industrial environments may be temporary or mobile, the wireless network 140 may be capable of automatically reorganizing itself. More specifically, in response to one or more predetermined conditions, pairs of field devices may recognize each other as neighbors and thus create a direct wireless connection 65 or, conversely, dissolve previously direct wireless connections 65. The network manager 142 (illustrated in FIG. 5 as residing in the wireless gateway 137) may additionally create, delete, or temporarily suspend paths between non-neighboring devices.

Figure 6:
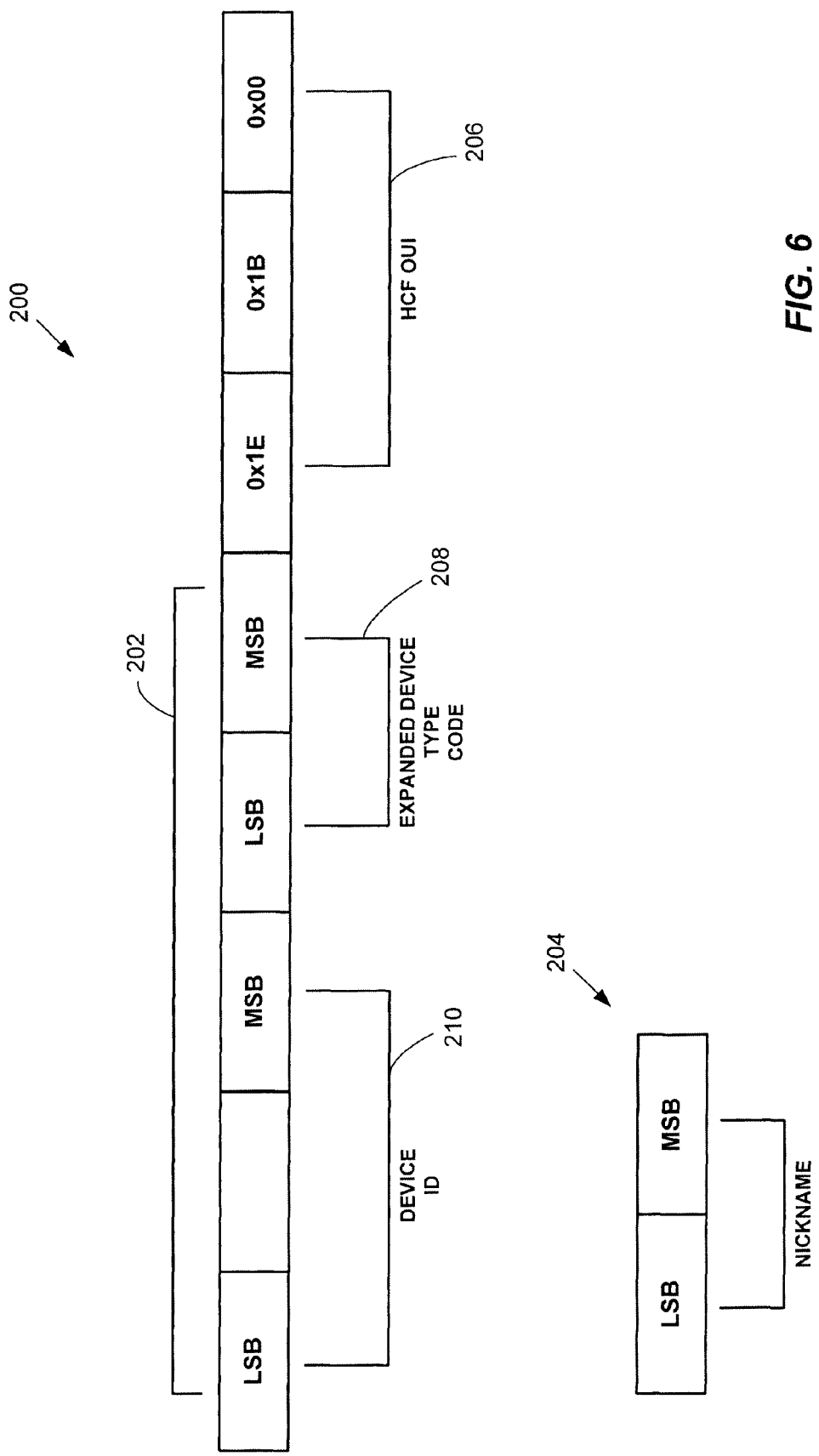
FIG. 6 is a block diagram illustrating an example of constructing an 8-byte address from a 5-byte wireless HART device identifier for use in the wireless network illustrated in FIG. 1.

Referring back to FIGS. 1, 4, and 5, the convenience of upgrading or extending a legacy network may further improve if the wireless network 14 or 140 provides an efficient approach to addressing the participating network devices. It may be particularly desirable to seamlessly extend an existing addressing scheme of a device to reduce or even eliminate the need to reconfigure legacy devices. Moreover, such addressing scheme may simplify the development of external applications for accessing and monitoring the wireless network 14 and, in at least some of the contemplated embodiments, may allow existing applications to access 14-20 mA devices, wired HART devices, and wireless HART devices using a single, uniform, and backward-compatible scheme. FIG. 6 schematically illustrates one approach to assigning address information to each network device 30-55, 136 and 138 which may provide some or all of the advantages discussed above.

Referring back to FIG. 2, the data link layer 76 of the wireless HART protocol 70 may use an 8-byte address 200 which is illustrated in FIG. 6. Meanwhile, the network layer 78 may use a unique five-byte identity 202 within the wireless HART network 14. In one embodiment, the wireless HART protocol 70 supports two types of addresses: a two-byte "nickname" 204 and the 8-byte IEEE EUI-64™ address 200. A packet associated with the data link 76, or data-link protocol data unit (DLPDU), may contain a dedicated field indicating whether the address included in the DLPDU is a two-byte nickname 204 or a full 8-byte address 200. In operation, network devices 30-50, 136 and 138 may route data packets within the wireless network 14 or 140 using either one of the two formats.

In one embodiment, the network manager 27 or 142 may assign the two-byte nickname 204 to individual network devices 30-55, 136 and 138 and manage the nicknames 304 during operation of the wireless network 14 or 140. Additionally or alternatively, other entities or network devices may participate in nickname management. The nickname 204 of a particular network device may be unique only locally, i.e., within the network 14 or 140 in which the network device operates. In most cases, a nickname 204 refers to a specific network device. However, a predefined value, such as 0xFFFF, may correspond to a broadcast address.

Further, the EUI-64 address 200 may include a three-byte Organizationally Unique Identifier (OUI) 206, assigned by Institute of Electrical and Electronics Engineers (IEEE), and the five-byte unique identifier 202, controlled by the HART Protocol 70 or wireless HART protocol 72. In the case of wireless HART, the full EUI-64 address 200 may be constructed using the Hart Communication Foundation (HCF) Organizationally Unique Identifier (OUI) 206 concatenated with the 40-bit HART unique identifier 202 as illustrated in FIG. 6.

Meanwhile, the unique identifier 202 may be a concatenation of the two-byte expanded device type code 208 and the two-byte device identifier 210. Preferably, the expanded device type code 208 is allocated by an organization responsible for the definition of the wireless HART protocol 70 such as HCF. Preferably, each device manufactured with the same device type code 208 has a distinct device identifier 210. Further, because IEEE 802.15.4 requires multi-byte fields to be transmitted LSB first ("little endian"), the wireless HART protocol 72 may be compliant with the LSB ordering. Consequently, the long address 200 is transmitted in the DLPDU starting with the least significant bit (LSB) of the device identifier 210 and ending with the MSB of the HCF OUI 306. In this embodiment, the nickname 204 may also transmitted little-endian (LSB first).

The addressing scheme described above in reference to FIG. 6 may provide a seamless transition from a wired environment supporting the wired HART protocol 72 to an at least partial wireless capability. From the foregoing, it will be appreciated that gradual addition of wireless HART devices 30, 32, etc. to a hardwired HART network without drastically rebuilding the respective process control environment is possible because of the seamless expansion of the established HART addressing scheme and of a wireless gateway capable of connecting various types of networks to the wireless HART network 14. The wireless gateway 22 or 137 may be a wireless HART device configured with a HART device type. In more general terms, the wireless gateway 22 or 137 is also a network device on the wireless HART network 14 or 140. On the other hand, the wireless gateway 22 or 137 may provide a Service Access Point (SAP) to the plant automation network 12. As one skilled in the art will recognize, Service Access Points generally serve as endpoints or entry points to various services or networks. It is therefore contemplated that the wireless gateway 22 or 137 may provide buffering and local storage for large data transfers in addition to tunneling and protocol translation.

Importantly, the second interface 23B of the wireless gateway 22 or 137 need not be restricted to any particular protocol. For example, an Ethernet-to-wireless wireless gateway 22 or 137 may provide a bidirectional path between an industrial Ethernet network and the wireless HART network 14, a Wi-Fi-to-wireless wireless gateway 22 or 137 may operate on a 802.11a/b/g radio link to similarly connect the wireless network 14 or 140 to a plant network, and a serial-to-wireless wireless gateway 22 or 137 may enable a connection to plant automation servers and other equipment which supports serial interfaces. Finally, many suppliers of process control equipment provide proprietary input/output (I/O) networks and consequently require a proprietary interface. In the latter case, the wireless gateway 22 may be provided with a system-specific, proprietary interface.

Figure 7:
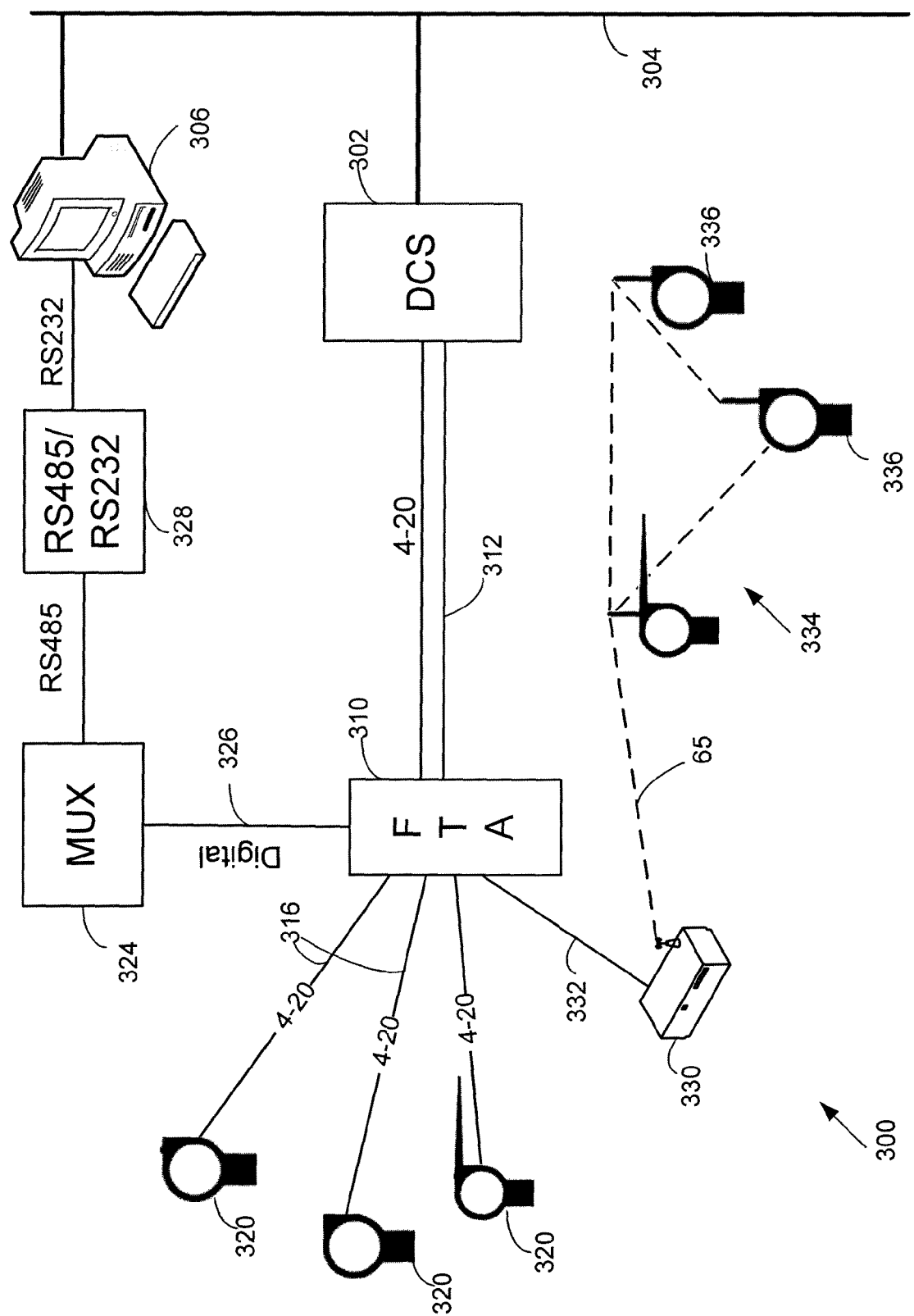
FIGS. 7-10 illustrate several example implementations of a wireless gateway in accordance with various network topologies and pre-existing installations.

FIGS. 7-10, along with FIG. 1, illustrate several embodiments of a wireless gateway which may useful in various network topologies and in view of different pre-existing installations and environmental conditions. In the example illustrated in FIG. 1, the wireless gateway 22 may connect the wireless HART network 14 to a plant automation network 12 via Ethernet or other standard protocol. However, the wireless gateway 22 or 127 may also support other types of connections. As illustrated in FIG. 7, for example, a network 300 may include a DCS 302 communicatively coupled to the factory backbone 305. A workstation 306 may be also coupled to the factory backbone 20 and may provide access to the DCS 302 and to the rest of the network 330 to operators and plant personnel. Further, the DCS 302 may communicate with a Field Termination Assembly (FTA) 310 over a set of wires 312 carrying variable DC current in the 4-20 mA range. As one of ordinary skill will recognize, the FTA 310 mainly serves the purpose of maintaining the same wiring 316 with the legacy 4-20 mA devices 320 while providing a certain degree of flexibility with respect to the vendor-specific wiring of the DCS 302. Additionally, the FTA 310 may be connected to a multiplexer 324 via a signaling link 326. Similar to the multiplexer 110 discussed earlier, the multiplexer 324 may provide signal translation between one or more inputs and one or more outputs. In this particular example, the multiplexer 324 may be connected to an adaptor 328 which may translate RS232 signaling to RS485 signaling and thus enable the workstation 306 to communicate with the multiplexer 324 via a standard RS232 serial port. Finally, another output of the FTA 310 may be connected to a wireless gateway 330 via a link 332 which, in turn, may be connected to a wireless HART network 33 including several wireless devices 336.

In one aspect, the wireless gateway 330 operates in the network 300 to seamlessly expand the legacy part of the network 300 including the wired field devices 320, the DCS 302, and the multiplexer 324 to include wireless HART devices 336 of the wireless HART network 300. In this embodiment, the link 326 and 332 between the wireless gateway 330 and the multiplexer 324 may both support a RS485 connection. This arrangement may allow the wireless gateway 330 to handle certain RS485 commands and to pass all other commands through to one of the target field devices 336 as HART commands.

In another embodiment, a wireless gateway may be provided as part of a new wireless network installation. Referring back to FIG. 1, the wireless gateway 22 may connect to the plant automation network 12. The network manager 27 and the security manager 28 may run on the wireless gateway 22 or on a host residing on the network 12, such as the workstation 16. The wireless gateway 22 may connect to the plant automation network 12 via any bus such as Profibus DP, for example.

In another embodiment which is also consistent with the illustration in FIG. 1, the gateway 22 may be a standalone unit including both the network manager 27 and the security manager 28. In this embodiment, a higher level application such as asset management software, for example, may run on the workstation 16 and communicate with the network devices 30-50. Also, the handheld wireless HART device 55 may read primary and secondary process measurements and alarms periodically transmit this data via the gateway 27 and over some other network type, such as a cellular network for example, to a host application. Alternatively, this host application may run on the workstation 16 or 18 which may communicate with the gateway 22 over the factory bone 20.

Figure 8:
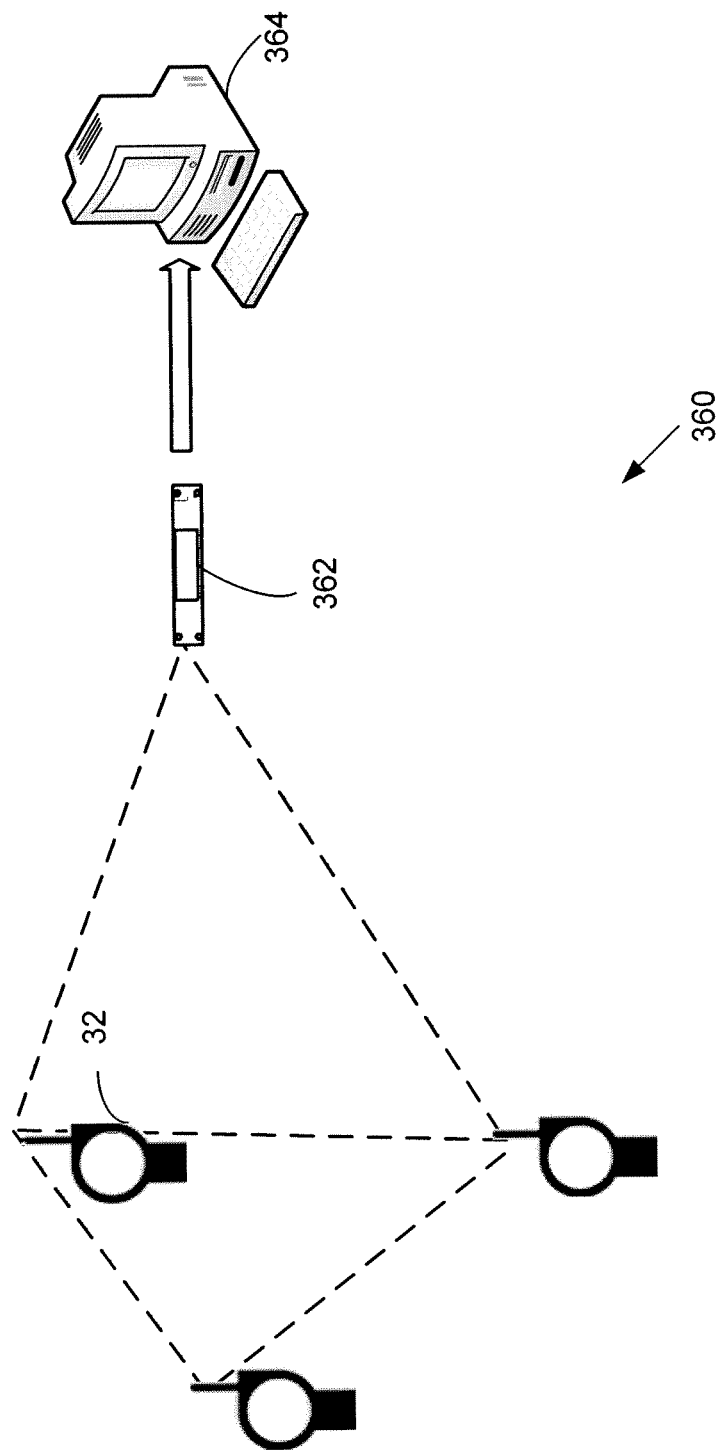

Now referring to FIG. 8, a network 360 may include another embodiment of the wireless gateway 362. In particular, the wireless gateway 362 may be implemented as a PC card compatible with an expansion slot of a personal computer or workstation 364. In this embodiment, the wireless gateway 362 may easily support higher level applications such as asset management software. Also, the primary and secondary measurements, alarms, etc. could also be accessed through the wireless gateway 362 operating as a SAP and processed locally or transmitted over some other network to other plant applications.

Figure 9:
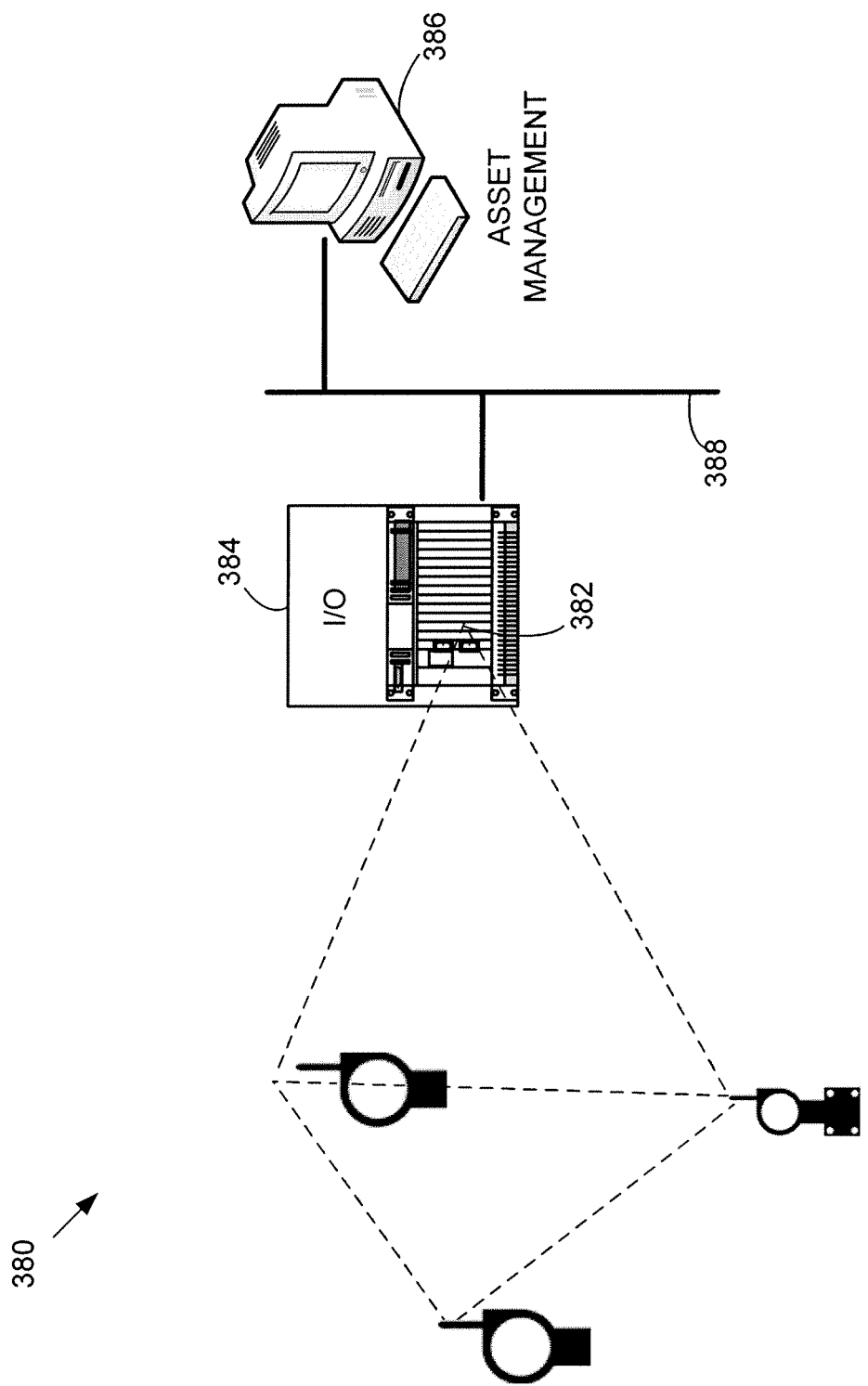

Finally, FIG. 9 illustrates a configuration 380 in which a wireless gateway 382 is built into an I/O system 384. Alternatively, the system 380 may be a DCS-based system. This configuration may provide I/O measurements for monitoring and control applications of the system 380. Additionally, higher level applications such as asset management applications running on a host 386 may operate with this particular configuration by tunneling HART commands through a control network residing on the factory backbone 388 and via the I/O system 384.

Figure 10:
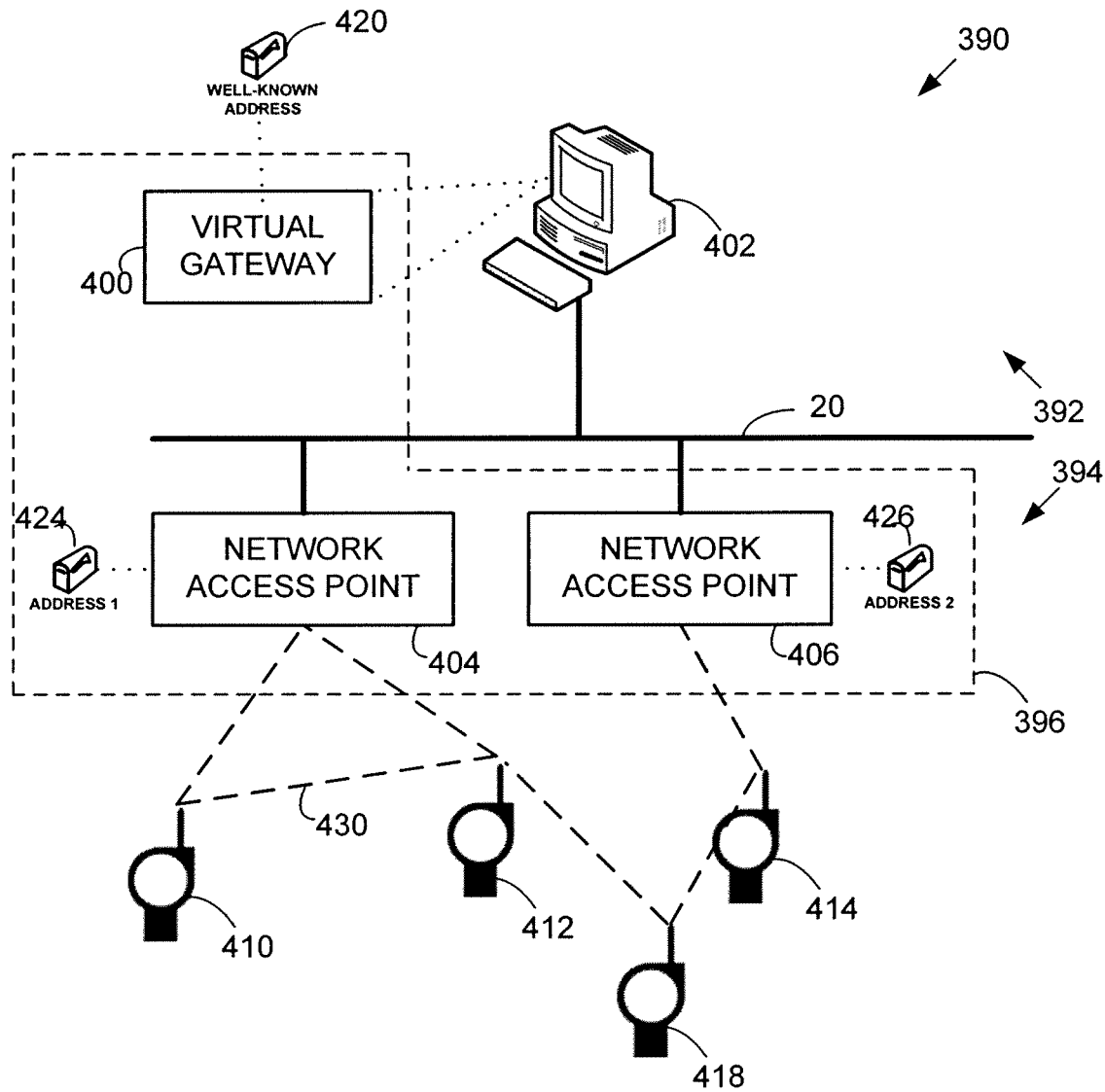

FIG. 10 provides a more detailed illustration of an embodiment in which a wireless gateway is distributed among several network components. In particular, a network 390 may include a plant automation network 392 coupled to a wireless network 394 via a gateway 396 which includes a virtual gateway 400 residing on a network host 402 and two network access points 404 and 406. In accordance with this embodiment, the gateway 396 may alternatively include a single access point 404 or 406 or, conversely, may include more than two access points 404 or 406. Moreover, the gateway 396 may be dynamically expanded with additional access points during operation. In general, the number of access points 404 or 406 may depend on such factors as a physical layout of the automation plant in which the wireless network 394 operates (e.g., obstacles blocking wireless signals, relative distances between wireless devices, etc.), bandwidth requirements of the wireless network 394 (e.g., a number of wireless devices transmitting data to a host operating in the plant automation network 392, a frequency of transmissions at each device), as well as the more obvious factors such as cost and the difficulty of wiring each individual network access points 404 and 406. Preferably but not necessarily, the access points 404 and 406 provide at least some redundancy with respect to each other so that if the network access point 404 fails, for example, the network access point 406 may take over and compensate for at least a part of the lost bandwidth.

In operation, the virtual gateway 400 may communicate with each of the network access points 404 and 406 to establish wireless connections with at least some of the wireless network devices 412-418 operating in the wireless network 394, provide clocking to the wireless network 394 via or both of network access points 404 and 406, control the allocation of wireless resources (e.g., timeslots and channels) at each of network access points 404 and 406. Additionally, the virtual gateway 400 may be responsible for protocol and address translation to ensure seamless co-operation of the wireless network 394 with the plant automation network 392.

Specifically with respect to addressing, the gateway 396 may increase the efficiency and reliability of routing of data to and from the wireless network devices 412-418 by assigning a well-known address 420 to the virtual gateway 400. Meanwhile, each of the network access points 404 and 406 may have a separate address 424 and 426, respectively. In operation, the network devices 412-418 may route data to the gateway 396 by specifying the well-known address 420. In this sense, the network devices 412-418 need not know how many network access points 404 and 406 operate as part of the gateway 396 or what addresses are associated with each of the network access points 404 and 406. Moreover, in some embodiments, each of the network devices 412-418 may have at least one path (e.g., a direct connection or a connection via one or more intermediate network devices) to each of network access points 404 and 406. In this manner, the entire wireless network 394 may remain accessible to a host in the network 392 even if all but one of the network access points 404 or 406 fail. In alternative embodiments, the virtual gateway 400 or the corresponding network manager may add or delete wireless connections between the network access points 404 or 406 and the network devices of the wireless network 394 in response to detecting a change in status of one or more of the network access points 404 or 406. For example, the gateway 400 may report a failure of the network access points 404 to the manager which, in turn, may add the direct connection 430 to create a path between the network 394 and the network access point 406 via the network device 412.

With respect to protocol translation, it will be noted that in general, the wireless gateway 396 may support any protocols running in the networks 392 and 394. However, in some embodiments, the gateway 396 may recognize the one or more shared layers of the respective protocols and leave the shared one or more upper layers intact when translating between the protocols. In one particularly useful embodiment, the wireless network 394 may operate using the wireless HART protocol 70 (see FIG. 2) and the host 402 may originate HART commands to the network devices 410-418 via a HART modem, for example. In this case, the gateway 396 may perform protocol translation on the layers 74-82 without modifying the data associated with the layer 84.

Referring generally to FIGS. 1, 4, 5, 7, and 8-10, the wireless network 14, 140, or 394 may further improve the responsiveness to changing environmental conditions and additionally improve the reliability of inter-device communications by gradually building the wireless network starting with a gateway device. Referring back to FIG. 1, the wireless HART network 14 may initially form from the network manager 27 and the gateway 22. In accordance with the various embodiments discussed earlier, the network manager 27 and the gateway 22 may reside on the same physical host or may be connected by a bidirectional connection in a wired or wireless manner. More specifically, FIG. 11 illustrates an example start-up procedure 450 which may run at initialization of the wireless HART network 14.

Figure 11:
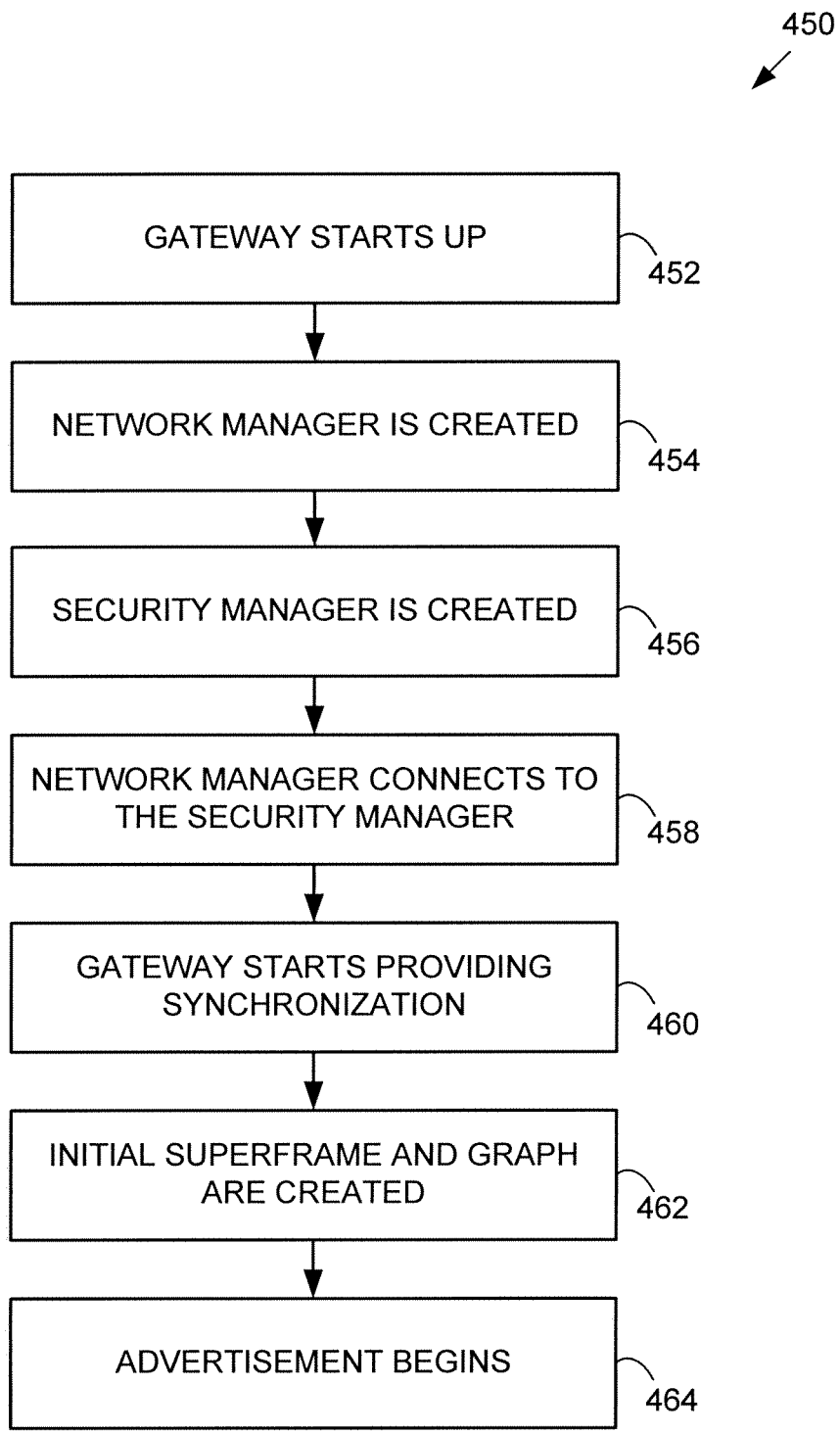
FIG. 11 is an exemplary start up sequence which a gateway device discussed herein may follow.

As illustrated in FIG. 11, the routine 450 may include a first step 452 during which the gateway 22 start ups and initializes. In a step 454, the gateway 22 may create an instance of the network manager 27. It will be noted that while the example step 454 includes the creation of the network manager 27 as a software instance running in the same physical host as the gateway 22, the network manager 27 may also run on one of the workstations 16 or 18 or may be distributed among several hardware components. In an alternative embodiment, the network manager 27 may start first and may create an instance of the virtual gateway 24.

Either the gateway 22 or the network manager 27 may then create an instance of the security manager 28 in a block 456. During operation of the wireless HART network 14, the security manager 28 may work with the network manager 27 to protect the wireless HART network 14 from various adversarial threats. In particular, the security manager 28 may provide security keys to the network manager 27 which may be used for device authentication and encryption of data in the wireless HART network 14. The security manager 28 may generate and manage the cryptographic material used by the wireless HART network 14 and may be also responsible for the generation, storage, and management of these keys. In a block 458, the security manager 28 may establish a connection with the network manager 27. In subsequent operations, the security manager 28 may work closely with the network manager 27 in a server-client architecture. In some embodiments, a single instance of the security manager 28 may service more than one wireless HART network 14.

Next, the gateway 22 may start providing clocking, or synchronization in a block 460. Because the wireless HART network 14 may have more than one gateway 22 and because synchronization typically comes from a single source, the network manager 27 may explicitly designate the source of synchronization. For example, the network manager 27 may designate the network access point 25A as the clocking source. If desired, both of the network access point 25A and network access point 25B of FIG. 1 may provide synchronized clocking signals.

With continued reference to FIG. 11, the network manager 27 may create a first superframe of the wireless HART network 14 and a first network graph in a block 462. The wireless HART network 14 may then start advertising in a block 464 so that field devices 30, 32, etc may process the advertisement packets and initiate the process of joining the network. As discussed above, the gateway 22 may reside on the wireless HART network 14 as a network device. Thus, field devices may communicate with the gateway 22 using the same commands and procedures these devices use to communicate with the neighboring field devices. Further, field devices may receive and respond to advertisement packets from any network devices, including the gateway 22.

Figure 12:
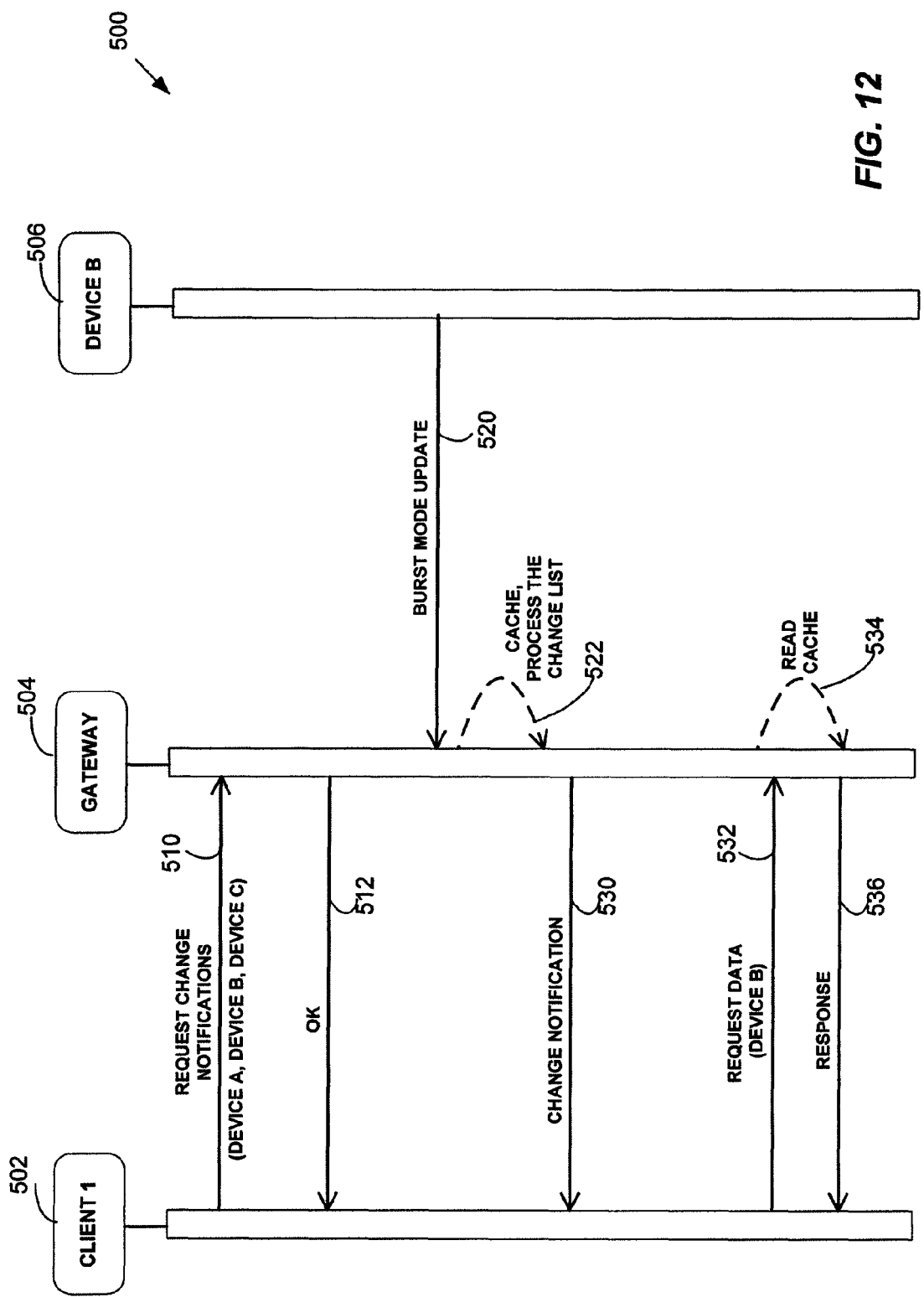
FIG. 12 is an example message sequence chart illustrating an exchange of messages related to caching burst mode data at the gateway device.

FIG. 12 illustrates yet another aspect of the operation of the gateway 22 by outlining, in a scenario 500, an exchange of messages between a client 502, a gateway 504, and a wireless field device 506. It will be noted that in this diagram, the gateway 504 may correspond to any implementation discussed above with reference to FIGS. 1-10 (e.g., gateway 22, 122, 137, 330, 362, 382, 396), while the client 502 may be any application or entity external to the wireless network 14, 140, 334, 360, 380, 394 and communicating with the corresponding gateway. The wireless field device 506 may be any wireless field device discussed above (e.g., field device 32 in FIG. 1) which preferably supports the commands of the corresponding wireless protocol (e.g., WirelessHART protocol 70). The discussion below will further illustrate that the gateway 504 may concurrently interact with several clients 502 residing on the same or different hosts, and may support an interaction with one or several wireless field devices 506 for each client 502.

As illustrated in FIG. 12, the client 502 may generate a request for notification changes 510, which may list one or several wireless field device 506. In this particular example, the client 502 may wish to receive updates related to the field devices A, B, and C. For the sake of simplicity, FIG. 12 illustrates only one of these three devices and only one client 502, but it will be appreciated that the scenario 500 may similarly involve several concurrent interactions. Upon receiving the request 510, the wireless gateway 504 may verify that the devices A, B, C in fact operate in the wireless network, to take just one example, and reply to the request 510 with an acknowledgement 512.

Next, the wireless gateway 504 may update an internal table or another memory structure to indicate that at least one external client now monitors the field devices A, B, and C. In one example embodiment, the wireless gateway 504 may maintain a linked list of wireless field devices associated with at least one monitoring or otherwise interacting external application. Each entry in the linked list in turn may correspond to a linked list of clients registered for these updates. When the wireless field device 506 (which may be the field device B) generates a periodic burst mode update (message 520), the wireless gateway 504 may step through the linked list of wireless field devices to see whether the wireless field device 506 belongs to the list and, in this example, the wireless field device 506 may locate an entry indicating that the client 502 has registered to receive process data, alarms, and/or other information. The wireless gateway 504 may additionally cache and timestamp the information included in the message 520 (procedure 522).

Next, the wireless gateway 504 may generate a change notification 530 for the client 502. In other embodiments, the client 502 may explicitly set up a notification schedule (e.g., once an hour, once a day, etc.) if real-time or quasi-real-time notifications are not desirable. In yet another embodiment, the client 502 may request conditional notifications (e.g., if the data indicates a temperature higher than 1000° Celsius) or specify an operator to whom the wireless gateway 504 should forward the change notification 530. In either case, the wireless gateway 504 may update a corresponding bit or flag to indicate that the notification has been sent. This way, another burst mode update 520 will not necessarily trigger a new change notification 530.

With continued reference to FIG. 12, the same client 502 or another client may request the process data related to the wireless field device 506 at a later time by generating a request data message 532. The wireless gateway 504 may simply execute a read cache procedure 534 and generate a response 536 reported the cached data. Because the wireless gateway 504 preferably timestamps the data in the cache and includes the timestamp in the response 536, the client 502 can properly interpret the cached data. Thus, the wireless gateway 504 may advantageously relieve the wireless network 14, 140, 334, 360, 380, or 39 from excessive polling by managing burst mode data (in this regard, it will be noted that the wireless field device 506 may publish burst data without receiving an explicit command for each update).

It will be appreciated that in addition to supporting burst mode data, the wireless gateway 504 may similarly accept alarms and alerts. In these cases, the wireless gateway 504 may acknowledge the alarms and/or alerts to unblock the originating wireless device, if necessary, and to ensure that the alarm or alert information is not lost. Moreover, the wireless field devices 506 reporting multiple variables may send variable updates as needed (e.g., as the changes occur) by using event reporting techniques. In some embodiments, the client 502 may send a certain command to the wireless gateway 504 which may active a specific type of event reporting in the wireless field device 506. Unlike burst mode data, event data may be relatively infrequent and may not require a large amount of bandwidth. Importantly, the wireless gateway 504 may similarly cache the event data, in response a request from the client 502, may forward the event data immediately upon reception to the client 502.

As indicated earlier, the wireless network 14, 140, 300, or 394 may include or more wireless handheld devices 55, which operators may use for various installation, maintenance, and diagnostic purposes, for example. Referring back to FIG. 1, the handheld device 55 may connect to the network device 36 via the direct wireless connection 65A. In this example configuration, the handheld device 55 may operate in the wireless network 14 as one of the network devices, i.e., as a node receiving network broadcast commands, participating in at leas the management superframe, etc. Moreover, the handheld device 55 in this configuration could establish additional direct wireless connections with other network devices such as the network access point 25B, for example, and may route data on behalf of other network devices 30-50.

Figure 13:
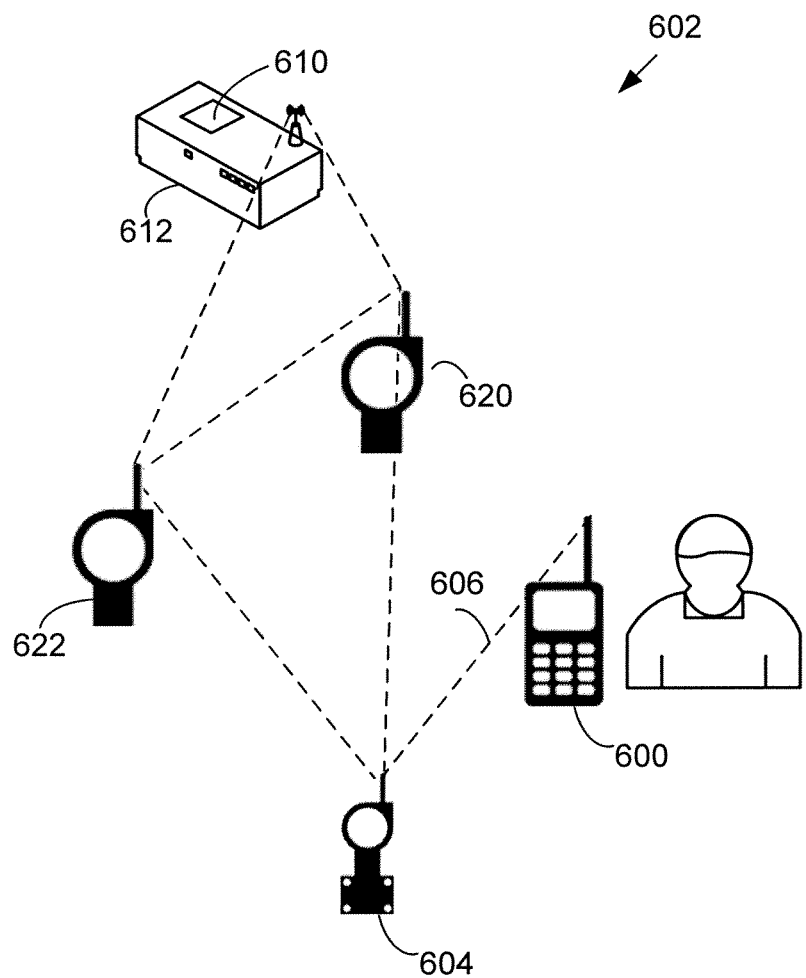
FIG. 13 illustrates several types of connections between a handheld device and the wireless network illustrated in FIG. 1.

By contrast, a handheld device 600 operating in a wireless network 602 (FIG. 13) may communicate only with a wireless field device 604 via a direct wireless connection 606. Unlike the configuration discussed above with reference to FIG. 1, the participation of the handheld device 600 in the wireless network 602 may be limited to calibration, diagnostics, collection of information, etc. from an individual network device. When operating in this mode, the handheld device 600 may be said to connect to the wireless network 14 as a maintenance device. A network manager 610, illustrated in FIG. 13 as a software module running in a gateway 612, may prevent a maintenance device such as the handheld device 600 from participating in other network operations such as routing data sent by other network nodes, propagate data to the gateway 612, request additional bandwidth for unscheduled transfers of data, etc. To this end, the network manager 610 may allocate a maintenance superframe reserved for communicating with maintenance devices. The maintenance superframe is preferably a high-speed superframe, although a relatively slow maintenance superframe may be sufficient in some applications. Each of the network devices 604 and 620-622 may be provisioned with similar information regarding the maintenance superframe (e.g., superframe length, start time, etc.) but the network manager 510 may keep the maintenance superframe in a deactivated state until a maintenance device attempts to connect to one of the network devices 604 or 620-622.

In one embodiment, only one handheld device 600 may operate with a network device of the wireless network 600 at any one time. The network manager 610 may activate the maintenance superframe in response to receiving a request form a handheld device 600 to temporarily join the wireless network 602 as a maintenance device, communicate the activation information to some or all network devices 604 and 620-522, and deactivate the maintenance superframe when the handheld device 600 disconnects from the corresponding network device. In other embodiments, the network manager 610 may manage multiple maintenance superframes which may have the same number of timeslots or, to better accommodate various types of maintenance devices, different numbers of timeslots.

In one possible scenario, a technician may wish to collect diagnostic information from one of the wireless field devices 604 and 620-622 with a minimum disturbance to the scheduled operation of the wireless network 602. Moreover, he or she may further wish to observe the device while performing a diagnostic routine, for example. To avoid connecting to the network device from a remote workstation via the gateway 512, the technician may carry the handheld device 600 up to the target field device and activate the appropriate routine which the handheld device 600 may execute to connect to the field device. Once activated, the handheld device 600 may listen to advertisement packets from the network devices, respond to the advertisement packet from the target field device, and send a bandwidth request to the network manager 610 within one of timeslots reserved for joining device. The network manager 610 may process the request and either reject the handheld device 600 (e.g., if the handheld device 600 fails to provide sufficient authentication information or if another maintenance device is already operating in the maintenance superframe) or grant the bandwidth request and activate the maintenance superframe. In particular, the network manager 610 may broadcast a single message through the network 602 to instruct each of the 604 and 620-622 that the maintenance superframe is now active. The network manager 610 may later deactivate the maintenance superframe by similarly broadcasting a deactivation message.

In some embodiments, the handheld device 600 may connect to the wireless network 500 as a maintenance device but use one or more intermediate hops to access the target network device. For example, a technician may not be able to approach a field device within a sufficiently short distance to establish a direct wireless connection due to a physical obstacle, for example. He or she may then use the handheld device 600 to connect to one of the proximate network devices via a direct wireless connection, and the proximate network device may forward the data between the target field device and the handheld device 600 within the maintenance superframe. It will be appreciated that because each network device 504 and 520-522 is provisioned with the maintenance superframe, the wireless network 602 may support this scenario without the use of additional commands or a lengthy procedure to negotiate bandwidth, readjust the entire network schedule, etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of providing a wireless extension to a plant automation network connected to a plurality of wired devices, each wired device performing a process control function, the method comprising:

connecting a plurality of wireless devices to the plant automation network, each of the plurality of wireless devices adapted to communicate with at least another one of the plurality of wireless devices via at least one respective wireless connection;

providing a gateway device connected to at least one of the plurality of wireless devices via a wireless connection and to the automation network via a wired connection;

caching at least one of process data, alarm data, or device data as cache data related to one of the plurality of wireless devices at the gateway device, wherein caching the process data at the gateway device includes receiving, at the gateway device, an unsolicited burst mode data report from the one of the plurality of wireless devices; and providing, to a host, access to each of the plurality of wireless devices, including receiving a change notification request from the host specifying a subset of the plurality of wired devices, and reporting the cached data to the host if the one of the plurality of wireless devices is associated with the subset, wherein:
      the host is disposed in the plant automation network,
      the host executes at least one of an asset management application or an alarm diagnostic application of the plant automation network,
      the host provides control and supervisory functions to personnel of a plant including the plant automation network, the host is communicatively connected in a wired manner to the plurality of wired devices, and
the host accesses the plurality of wired devices and the plurality of wireless devices using a common communication scheme.

2. The method of claim 1, wherein the common communication scheme includes a network addressing scheme consistent with the Highway Addressable Remote Transducer (HART®) protocol.

3. The method of claim 1,
wherein each of the plurality of wired devices communicates using a wired communication protocol;
wherein each of the plurality of wireless devices communicates using a wireless communication protocol; and
wherein providing, to the host, access to each of the plurality of wireless devices further includes:
receiving, from the host, a command compatible with the wired communication protocol;
determining whether the command is associated with one of the plurality of wired devices or one of the plurality of wireless devices; and
translating the command to the wireless communication protocol if the command is associated with one of the plurality of wireless devices.

4. The method of claim 1, wherein connecting a plurality of wireless devices to the plant automation network includes generating a mesh multi-node network including each of the plurality of wireless devices as a respective node and the gateway device as another node.

5. The method of claim 1, wherein providing a gateway device includes translating between a first protocol and a second protocol at the gateway device; wherein the first protocol supports wired communications in the plant automation network and the wherein the second protocol supports wireless communications between the gateway device and each of the plurality of wireless devices.

6. The method of claim 1, further comprising, when a handheld device is physically proximate to one of the plurality of wireless devices:
providing, to the handheld device, wireless access to the one of the plurality of wireless devices by bypassing the gateway device, and directly and wirelessly connecting the handheld device to the one of the plurality of wireless devices.

7. The method of claim 6, wherein providing wireless access to the one of the plurality of wireless devices includes:
activating a scheduling resource reserved for the handheld device; and
allowing the handheld device to directly communicate with the one of the wireless devices and only within a time period associated with the scheduling resource reserved for the handheld device.

8. The method of claim 1, wherein caching the alarm data includes:
receiving, at the gateway device, an alarm from the one of the plurality of wireless devices;
generating an acknowledgement corresponding to the alarm;
generating a timestamp associated with a time of arrival of the alarm; and
caching the alarm in a memory of the gateway device for reporting to a requesting entity associated with the host.

9. A method of providing a wireless extension to a plant automation network connected to a plurality of wired devices, each wired device performing a process control function, the method comprising:

connecting a plurality of wireless devices to the plant automation network, each of the plurality of wireless devices adapted to communicate with at least another one of the plurality of wireless devices via at least one respective wireless connection;
providing a gateway device connected to at least one of the plurality of wireless devices via a wireless connection and to the automation network via a wired connection;
caching at least one of process data, alarm data, or device data as cache data related to one of the plurality of wireless devices at the gateway device; and
providing, to a host, access to each of the plurality of wireless devices, including receiving a change notification request from the host specifying a subset of the plurality of wired devices, and reporting the cached data to the host if the one of the plurality of wireless devices is associated with the subset,
wherein:
at least one of reporting the cached data and receiving the change notification request is associated with a real-time delivery mode and the other one of reporting the cached data and receiving the change notification request is associated with a non-real-time delivery mode,
the host is disposed in the plant automation network,
the host executes at least one of an asset management application or an alarm diagnostic application of the plant automation network,
the host provides control and supervisory functions to personnel of a plant including the plant automation network,
the host is communicatively connected in a wired manner to the plurality of wired devices, and
the host accesses the plurality of wired devices and the plurality of wireless devices using a common communication scheme.

10. The method of claim 1, wherein:
each of the plurality of wired devices communicates using a wired communication protocol having at least a first physical layer and an application layer layered over the first physical layer and zero or more intermediate layers;
each of the plurality of wireless devices communicates using a wireless communication protocol having at least a second physical layer and the application layer layered over the second physical layer and zero or more intermediate layers; and
the application layer is shared between the wired communication protocol and the wireless communication protocol.

11. The method of claim 10, wherein the application layer is consistent with the HART® communication protocol.

12. The method of claim 1, wherein connecting a plurality of wireless devices to the plant automation network includes generating a mesh multi-node network wherein each of the plurality of wireless devices is a respective node of the mesh multi-node network; the method further comprising:
operatively coupling at least one adapter device to one of the plurality of wired devices to enable the one of the plurality of wired devices to operate in the mesh multi-node network as another node of the mesh multi-node network.

13. The method of claim 1, wherein connecting a plurality of wireless devices to the plant automation network includes generating a mesh multi-node network including each of the plurality of wireless devices as a respective node; the method further comprising:

accepting a request from a new wireless device not included in the plurality of wireless device to join the mesh multi-node network; and allowing the host to access the new wireless device without restarting the mesh multi-node network.

14. The method of claim 9, wherein the common communication scheme includes a network addressing scheme consistent with the Highway Addressable Remote Transducer (HART®) protocol.

15. The method of claim 9, wherein each of the plurality of wired devices communicates using a wired communication protocol;

wherein each of the plurality of wireless devices communicates using a wireless communication protocol; and wherein providing, to the host, access to each of the plurality of wireless devices further includes:

receiving, from the host, a command compatible with the wired communication protocol;

determining whether the command is associated with one of the plurality of wired devices or one of the plurality of wireless devices; and translating the command to the wireless communication protocol if the command is associated with one of the plurality of wireless devices.

16. The method of claim 9, wherein connecting a plurality of wireless devices to the plant automation network includes generating a mesh multi-node network including each of the plurality of wireless devices as a respective node and the gateway device as another node.

17. The method of claim 9, wherein providing a gateway device includes translating between a first protocol and a second protocol at the gateway device; wherein the first protocol supports wired communications in the plant automation network and the wherein the second protocol supports wireless communications between the gateway device and each of the plurality of wireless devices.

18. The method of claim 9, wherein caching the alarm data includes:

receiving, at the gateway device, an alarm from the one of the plurality of wireless devices;

generating an acknowledgement corresponding to the alarm;

generating a timestamp associated with a time of arrival of the alarm; and caching the alarm in a memory of the gateway device for reporting to a requesting entity associated with the host.

19. The method of claim 9, wherein connecting a plurality of wireless devices to the plant automation network includes generating a mesh multi-node network wherein each of the plurality of wireless devices is a respective node of the mesh multi-node network; the method further comprising:

operatively coupling at least one adapter device to one of the plurality of wired devices to enable the one of the plurality of wired devices to operate in the mesh multi-node network as another node of the mesh multi-node network.

20. The method of claim 9, wherein connecting a plurality of wireless devices to the plant automation network includes generating a mesh multi-node network including each of the plurality of wireless devices as a respective node; the method further comprising:

accepting a request from a new wireless device not included in the plurality of wireless device to join the mesh multi-node network; and allowing the host to access the new wireless device without restarting the mesh multi-node network.

* * * * *